(12) United States Patent
Grace et al.

(10) Patent No.: US 12,531,305 B2
(45) Date of Patent: Jan. 20, 2026

(54) THERMO-STRUCTURAL BATTERY PACKS AND SYSTEMS

(71) Applicant: Estes Energy Solutions, Inc., San Francisco, CA (US)

(72) Inventors: Dustin Grace, San Francisco, CA (US); Cagkan Yildiz, San Mateo, CA (US); David Lai, San Francisco, CA (US); Kassem Alhussein, Millbrae, CA (US)

(73) Assignee: Estes Energy Solutions, Inc., San Francisco, CA (US)

( * ) Notice: Subject to any disclaimer, the term of this patent is extended or adjusted under 35 U.S.C. 154(b) by 0 days.

(21) Appl. No.: 18/934,394

(22) Filed: Nov. 1, 2024

(65) Prior Publication Data

US 2025/0391984 A1 Dec. 25, 2025

Related U.S. Application Data

(60) Provisional application No. 63/661,912, filed on Jun. 20, 2024.

(51) Int. Cl.
*H01M 50/249* (2021.01)
*H01M 10/613* (2014.01)
(Continued)

(52) U.S. Cl.
CPC ....... *H01M 50/249* (2021.01); *H01M 10/613* (2015.04); *H01M 10/625* (2015.04);
(Continued)

(58) Field of Classification Search
CPC ............. H01M 50/249; H01M 10/613; H01M 10/625; H01M 10/6556
See application file for complete search history.

(56) References Cited

U.S. PATENT DOCUMENTS

| 8,057,630 B2 | 11/2011 | Hermann et al. |
| 8,906,541 B2 | 12/2014 | Faass et al. |

(Continued)

FOREIGN PATENT DOCUMENTS

| CN | 114094225 A | * | 2/2022 | .......... H01M 10/613 |
| CN | 218827391 U | * | 4/2023 | |

(Continued)

OTHER PUBLICATIONS

Xu et al., "Thermal Management for Battery Module with Liquid-Cooled Shell Structure under High Charge/Discharge Rates and Thermal Runaway Conditions," School of Mechanical and Automotive Engineering, Shanghai University of Engineering Science, published Mar. 29, 2023, 20 pages.

(Continued)

*Primary Examiner* — Jonathan G Jelsma
(74) *Attorney, Agent, or Firm* — STERNE, KESSLER, GOLDSTEIN & FOX P.L.L.C.

(57) ABSTRACT

Thermally managed electric vehicle battery packs and systems comprising a battery sub-packs designed to mate and coupled together such that the sub-packs define a battery cell compartment comprising a first set of battery cells and a second set of battery cells. The sub-packs can comprise integrated coolant compartments, ancillary compartments, or both. The sub-packs can comprise casted metal alloy frames defining various components of the battery packs. The battery packs and systems can comprise a stackable architecture that facilitates, among other things, efficient manufacturing of packs that can be stacked together, and efficient thermal regulation and space utilization in products.

29 Claims, 25 Drawing Sheets

(51) Int. Cl.
  *H01M 10/625* (2014.01)
  *H01M 10/6556* (2014.01)
  *H01M 10/6561* (2014.01)
  *H01M 50/224* (2021.01)
  *H01M 50/264* (2021.01)
  *H01M 50/289* (2021.01)

(52) U.S. Cl.
  CPC ... *H01M 10/6556* (2015.04); *H01M 10/6561* (2015.04); *H01M 50/224* (2021.01); *H01M 50/264* (2021.01); *H01M 50/289* (2021.01)

(56) References Cited

U.S. PATENT DOCUMENTS

| | | | |
|---|---|---|---|
| 9,156,362 | B2 | 10/2015 | Soden et al. |
| 9,365,123 | B2 | 6/2016 | Flack |
| 9,365,124 | B2 | 6/2016 | Soden et al. |
| 9,421,875 | B1 | 8/2016 | Flack |
| 9,533,599 | B2 | 1/2017 | Soden et al. |
| 9,597,976 | B2 | 3/2017 | Dickinson et al. |
| 9,844,148 | B2 | 12/2017 | Coakley et al. |
| 9,981,563 | B2 | 5/2018 | Flack |
| 10,020,550 | B2 | 7/2018 | Sumpf, Jr. et al. |
| 10,308,490 | B2 | 6/2019 | Dickinson et al. |
| 10,333,318 | B2 | 6/2019 | Flack |
| 10,348,103 | B2 | 7/2019 | Soden et al. |
| 11,043,823 | B2 | 6/2021 | Mathews et al. |
| 11,292,344 | B2 | 4/2022 | Soden et al. |
| 11,309,601 | B2 | 4/2022 | Haussmann et al. |
| 11,706,896 | B2 | 7/2023 | Krivonak et al. |
| 2014/0363712 | A1 | 12/2014 | Wohrle et al. |
| 2015/0115890 | A1 | 4/2015 | Dickinson et al. |
| 2015/0367742 | A1 | 12/2015 | Soden et al. |
| 2016/0031335 | A1 | 2/2016 | Soden et al. |
| 2016/0257218 | A1 | 9/2016 | Flack |
| 2016/0339786 | A1 | 11/2016 | Dickinson et al. |
| 2016/0347191 | A1 | 12/2016 | Hayashigawa et al. |
| 2017/0066340 | A1 | 3/2017 | Flack |
| 2017/0066341 | A1 | 3/2017 | Soden et al. |
| 2017/0158475 | A1 | 6/2017 | Dickinson et al. |
| 2017/0274751 | A1 | 9/2017 | Obrist et al. |
| 2017/0288286 | A1 | 10/2017 | Buckhout et al. |
| 2018/0244166 | A1 | 8/2018 | Flack |
| 2019/0190097 | A1 | 6/2019 | Haussmann et al. |
| 2019/0288525 | A1 | 9/2019 | Soden et al. |
| 2019/0334141 | A1* | 10/2019 | Kwon ............... H01M 10/6563 |
| 2020/0376928 | A1 | 12/2020 | Baecker et al. |
| 2021/0013565 | A1* | 1/2021 | Pucher ............... H01M 50/204 |
| 2021/0098760 | A1* | 4/2021 | Jeon ................ H01M 10/647 |
| 2021/0098844 | A1 | 4/2021 | Haussmann et al. |
| 2021/0167457 | A1 | 6/2021 | Haussmann et al. |
| 2021/0167465 | A1 | 6/2021 | Haussmann |
| 2021/0265679 | A1 | 8/2021 | Wang et al. |
| 2021/0384584 | A1 | 12/2021 | Scheid et al. |
| 2021/0384594 | A1 | 12/2021 | Schoneberger et al. |
| 2022/0045393 | A1 | 2/2022 | Tofaute |
| 2022/0052413 | A1 | 2/2022 | Haussmann |
| 2022/0077696 | A9 | 3/2022 | Soden et al. |
| 2022/0173477 | A1 | 6/2022 | Schink et al. |
| 2022/0194242 | A1 | 6/2022 | Podolski |
| 2022/0216556 | A1 | 7/2022 | Herter et al. |
| 2022/0263175 | A1 | 8/2022 | Hoffmann et al. |
| 2022/0314827 | A1 | 10/2022 | Podolski |
| 2022/0328920 | A1 | 10/2022 | Lobisser et al. |
| 2022/0388408 | A1 | 12/2022 | Podolski |
| 2022/0389945 | A1 | 12/2022 | Covic et al. |
| 2022/0407146 | A1 | 12/2022 | Dahitule et al. |
| 2023/0006300 | A1 | 1/2023 | Schoneberger et al. |
| 2023/0187764 | A1 | 6/2023 | Wass et al. |
| 2023/0216123 | A1 | 7/2023 | Piepponen |
| 2023/0223636 | A1 | 7/2023 | Meyer |
| 2023/0241988 | A1 | 8/2023 | Podolski et al. |
| 2023/0282909 | A1 | 9/2023 | Meyer et al. |
| 2023/0378568 | A1* | 11/2023 | Park .................. H01M 10/647 |
| 2024/0079671 | A1 | 3/2024 | Gow et al. |
| 2024/0113396 | A1 | 4/2024 | Pradella et al. |
| 2024/0113397 | A1 | 4/2024 | Pradella et al. |
| 2024/0145799 | A1 | 5/2024 | Zeilbeck et al. |
| 2024/0173768 | A1* | 5/2024 | Hwang ............... H01M 50/249 |

FOREIGN PATENT DOCUMENTS

| | | |
|---|---|---|
| DE | 102017130559 A1 | 6/2019 |
| DE | 102018108003 A1 | 10/2019 |
| DE | 102018125439 A1 | 4/2020 |
| DE | 102018125442 A1 | 4/2020 |
| DE | 102018125447 A1 | 4/2020 |
| DE | 102018125453 A1 | 4/2020 |
| DE | 102019104130 A1 | 8/2020 |
| DE | 102019125040 A1 | 3/2021 |
| DE | 102021103922 A1 | 8/2022 |
| DE | 102021105037 A1 | 9/2022 |
| DE | 102021118630 A1 | 1/2023 |
| DE | 102021118631 A1 | 1/2023 |
| DE | 102021118632 A1 | 1/2023 |
| DE | 102021125167 A1 | 3/2023 |
| DE | 102022107318 A1 | 10/2023 |
| DE | 102022116265 A1 | 1/2024 |
| DE | 102022120590 A1 | 2/2024 |
| KR | 20180091441 A | 8/2018 |
| WO | WO 2000/036669 | 6/2000 |
| WO | WO 2019/206976 A1 | 10/2019 |
| WO | WO 2019/238721 A1 | 12/2019 |
| WO | WO 2020/030649 A1 | 2/2020 |
| WO | WO 2020/212571 A1 | 10/2020 |
| WO | WO 2022/008538 A1 | 1/2022 |
| WO | WO 2022008610 A1 | 1/2022 |
| WO | WO 2022/253897 A1 | 12/2022 |
| WO | WO 2023/006925 A1 | 2/2023 |
| WO | WO 2023/007032 A1 | 2/2023 |
| WO | WO 2023/025753 A2 | 3/2023 |
| WO | WO 2023/088997 A1 | 3/2023 |
| WO | WO 2023/052398 A2 | 4/2023 |
| WO | WO 2023/079027 A1 | 5/2023 |
| WO | WO 2023/099739 A1 | 6/2023 |
| WO | WO 2023/099740 A1 | 6/2023 |
| WO | WO 2023/104931 A1 | 6/2023 |
| WO | WO 2023/148328 A1 | 8/2023 |
| WO | WO 2023/161370 A1 | 8/2023 |
| WO | WO 2023/237527 A1 | 12/2023 |
| WO | WO 2024/062011 A1 | 3/2024 |
| WO | WO 2024/067982 A1 | 4/2024 |
| WO | WO 2024/079243 A1 | 4/2024 |
| WO | WO 2024/079244 A1 | 4/2024 |
| WO | WO-2024121599 A1 * | 6/2024 .......... H01M 50/244 |

OTHER PUBLICATIONS

International Search Report and Written Opinion of the International Searching Authority directed to International Patent Application No. PCT/US2025/034219, mailed Nov. 24, 2025; 17 pages.

\* cited by examiner

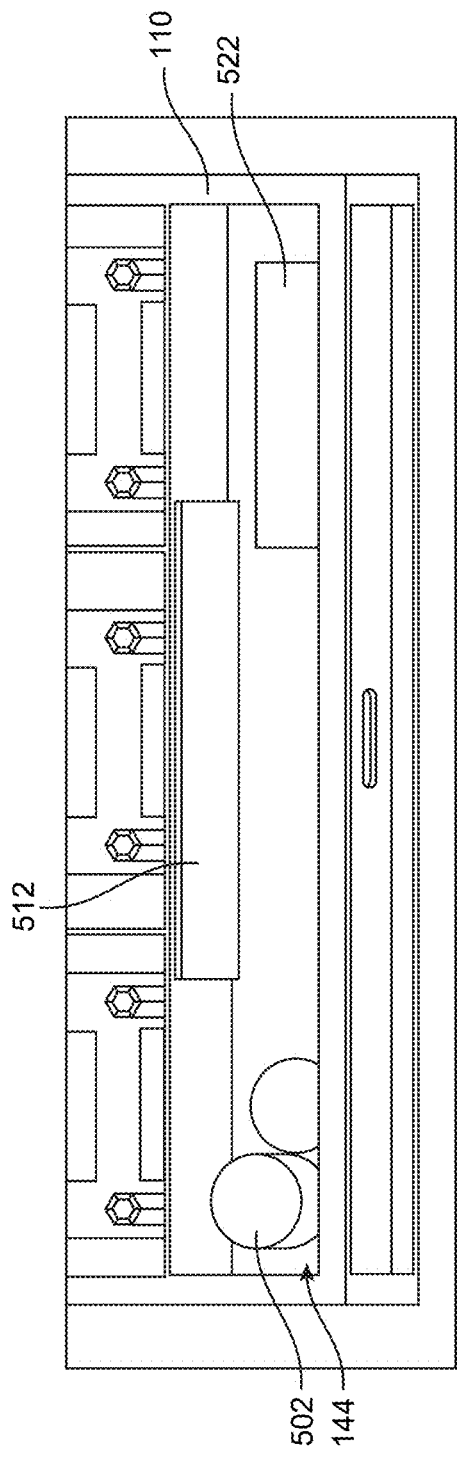
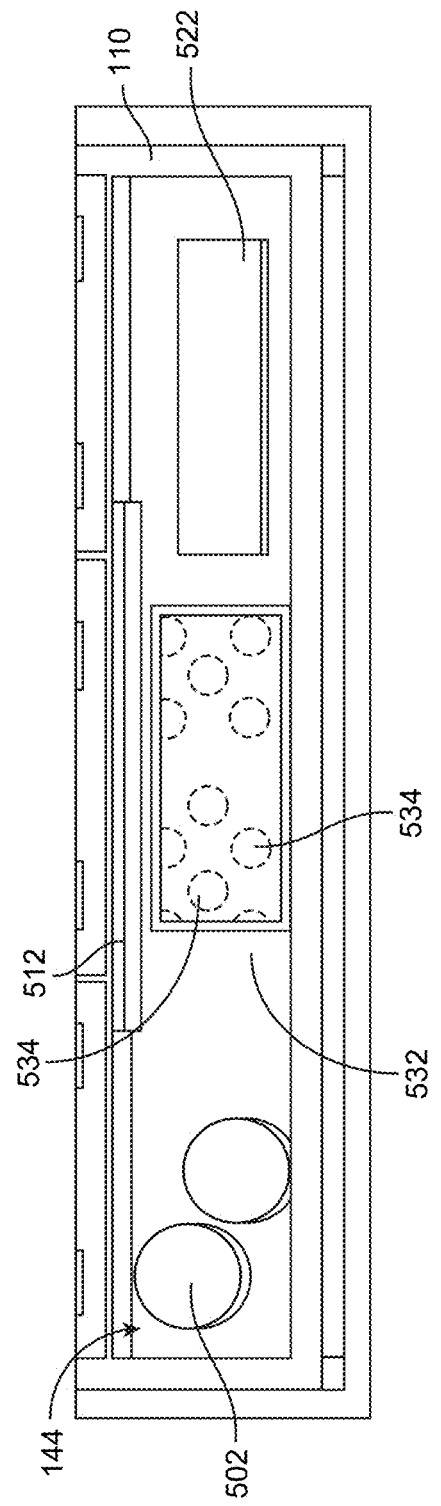
FIG. 5A
FIG. 5B

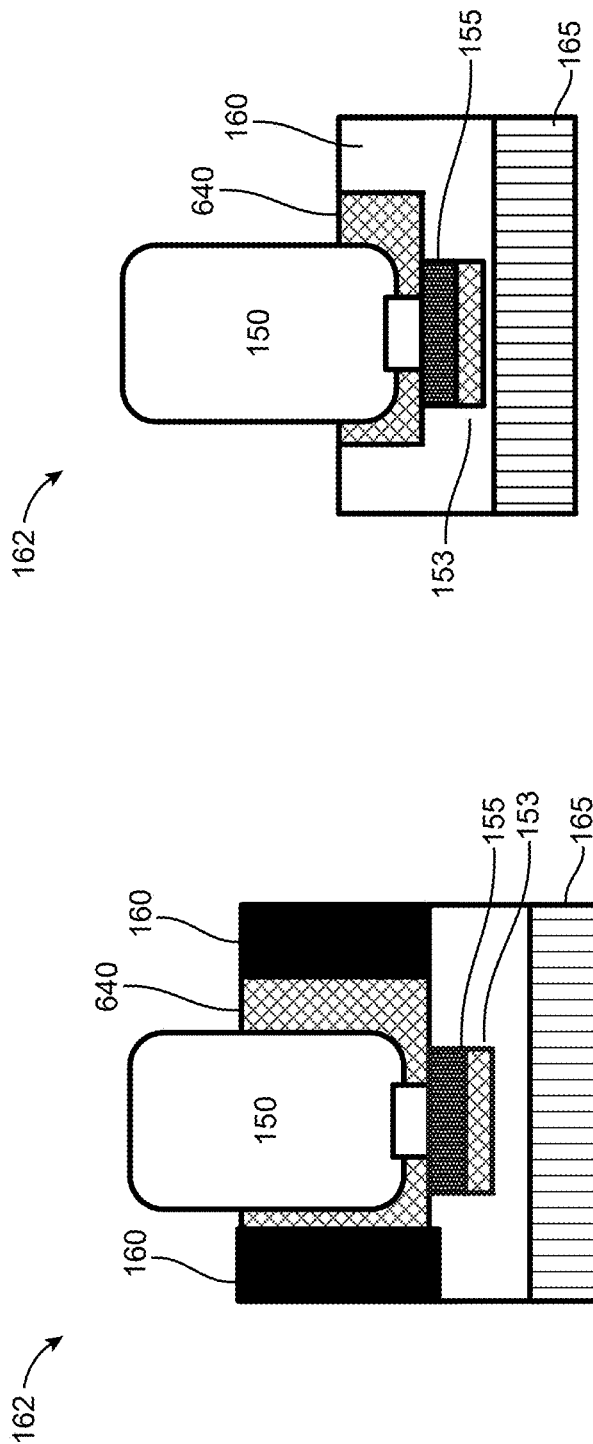

| PACK | STRING ENERGY | STRING VOLTAGE |
|---|---|---|
| Sodium-Ion (e.g., PBA, layered oxide or Polyanion | 15 kWh to 250 kWh | 12 V up to 1200 V |
| Iron based Li-Ion (e.g., LFP or LMFP) | 15 kWh to 250 kWh | 12 V up to 1200 V |
| Nickel Based Li-Ion (e.g., NCM, NCA, NCMA) | 15 kWh to 250 kWh | 12 V up to 1200 V |

FIG. 10

THERMO-STRUCTURAL BATTERY PACKS AND SYSTEMS

CROSS-REFERENCE TO RELATED APPLICATION

The present application claims priority to U.S. Provisional Application No. 63/661,912, filed on Jun. 20, 2024, which is hereby incorporated by reference in its entirety.

BACKGROUND

To meet the global challenge posed by climate change, countries are developing multi-pronged policies and incentives to transition the mobility industry from fossil fuels to zero-emissions vehicles. Batteries are a critical component for the transition to zero emissions in the mobility sector. For electric vehicles in particular, the size, weight, performance, and life of the battery impacts customer adoption as a practical and cost-efficient alternative to fossil fuel-powered vehicles.

Further, de-carbonization initiatives continue to drive explosive growth in the worldwide production and deployment of electric vehicles. According to the International Energy Agency (IEA), the number of electric autos has risen from less than 1M cars to over 40M worldwide in just the last decade. This growth is not limited to passenger cars, but extends to heavy-duty electric vehicles, such as electric buses and trucks, which have also seen tremendous growth and significant marketplace penetration. This worldwide growth is anticipated to continue, with the IEA forecasting that by the year 2035 there will be over 525M electric vehicles on the road worldwide. Decreasing the cost and weight of components generally, and in particular the cost and weight of the battery electrification system, while maintaining cost and performance parity with combustion power systems, is fundamentally important to the continued growth and deployment of electric vehicles. It is imperative to develop battery electrification systems that minimize weight to achieve the highest energy density possible, while minimizing cost to achieve better economics than fossil fuel combustion vehicles.

Surprisingly, while battery cell technology has advanced significantly, improvement in battery pack and enclosure design has not kept pace. Battery enclosures are a fundamental, but perhaps a somewhat overlooked component of battery electrification systems. Battery enclosures, for example, in addition to providing the basic structural enclosure for the battery pack, facilitate attachment of battery packs to vehicle chassis, protect battery cells from harsh environments, provide essential safety functions, provide thermal management, and provide safety systems. Ideally the enclosure can also support improved battery life and extend battery charge capabilities through thermo-structural control. The enclosures must achieve all of these objectives, while also being lightweight and durable—all at a reasonable cost to produce.

Existing battery pack designs use a cold plate that is separate from the battery enclosure. Coolant is located inside a component where battery cells are directly or indirectly in the conductive path of the coolant inside the same enclosure. The egress points of the welded seams in current battery pack designs in direct contact with the part of the enclosure containing the battery cells. As a result, the most observed battery failure occurs when coolant leaks at the seams. Accumulation of coolant in the same space as the battery cells and/or the HV-chain can result in a domino effect of failure modes that leads to thermal runaway in the battery pack.

Another shortcoming of existing battery enclosures is that components of the pack are passively cooled. Such passive cooling can result in circuit overheating. Current battery enclosures also use a cover and tub methodology, or extrusion frames with a cover methodology, both of which require a high number of fasteners to maintain seals and structural integrity.

Additionally, while existing battery packs can be modular in nature, some of the modules do not act as a structural component of the pack, which requires the inclusion of an additional structural enclosure to house the pack and handle load bearing during use. This additional structural enclosure increases manufacturing complexity and reduces energy density. On the other hand, for existing battery packs that do have load bearing modules, the modules often have higher aspect ratios resulting in low torsional and/or bending stiffness, which creates an integration difficulty during implementation as the batteries become cargo as opposed to a useful structural element.

Accordingly, there exists a need for battery packs and enclosures designed to optimize structural and thermal performance, while persevering or improving battery efficiency, lifetime, and safety. Further, there exists a need for these battery packs and enclosures to be designed with components that readily adapt to many different product design constraints, application needs, and government regulations.

SUMMARY

Battery packs and systems described herein are designed with integrated components that provide, among other things, a stackable architecture, efficient thermal regulation of battery cells, and failure-safe modes of operation. As described herein, the battery packs can comprise integrally formed (for example, cast) alloy frames manufactured to incorporate various structural and thermal features into a single part. These alloy frames also provide features that facilitate connection between other parts of a battery system, for example other battery packs, electrical components of the system, and thermal regulation components of the system. The frames are designed to be interchangeable in nature, such that the frames provide a stackable architecture adapted to different product designs and constraints.

A first embodiment (1) of the present application is directed to an electric vehicle battery pack, comprising: a first sub-pack comprising a first metal alloy enclosure comprising a first battery bay, and a first set of battery cells disposed within the first battery bay; and a second sub-pack comprising a second metal alloy enclosure comprising a second battery bay, and a second set of battery cells disposed within the second battery bay, wherein the first sub-pack is coupled to the second sub-pack such that the first battery bay and the second battery bay define a battery cell compartment comprising the first set of battery cells and the second set of battery cells.

In a second embodiment (2) the first sub-pack according to the first embodiment (1) comprises a single cast metal alloy frame and the second sub-pack according to the first embodiment (1) comprises a single cast metal alloy frame.

In a third embodiment (3), an interior sidewall of the first sub-pack according to the first embodiment (1) or the second embodiment (2) and an interior sidewall of the second sub-pack according to the first embodiment (1) or the second embodiment (2) are coated with a sealant bonding the first sub-pack to the second sub-pack.

In a fourth embodiment (4), the first sub-pack and the second sub-pack according to any one of embodiments (1)-(3) are coupled with a plurality of mechanical fasteners.

In a fifth embodiment (5), an exterior sidewall of the first sub-pack according to any one of embodiments (1)-(4) and an exterior sidewall of the second sub-pack according to any one of embodiments (1)-(4) are coated with a second sealant bonding the first sub-pack to the second sub-pack.

In a sixth embodiment (6), the first battery bay according to any one of embodiments (1)-(5) comprises a plurality of first spots in which a respective one of the battery cells in the first set of battery cells is disposed, the first spots being demarcated by a plurality of protrusions extending from an interior surface of the first battery bay, and the second battery bay according to any one of embodiments (1)-(5) comprises a plurality of second spots in which a respective one of the battery cells in the second set of battery cells is disposed, the second spots being demarcated by a plurality of protrusions extending from an interior surface of the second battery bay.

In a seventh embodiment (7), each of the first spots according to the sixth embodiment (6) comprises at least a portion of a first gully network formed in the interior surface of the first battery bay.

In an eighth embodiment (8), the first gully network according to the seventh embodiment (7) comprises an electrical contact electrically coupled to the first set of battery cells.

In a ninth embodiment (9), each of the second spots according to any one of embodiments (6)-(8) comprises at least a portion of a second gully network formed in the interior surface of the second battery bay.

In a tenth embodiment (10), the second gully network according to the ninth embodiment (9) comprises an electrical contact electrically coupled to the second set of battery cells.

In an eleventh embodiment (11), the plurality of protrusions extending from the interior surface of the first battery bay according to any one of embodiments (6)-(10) comprises a plurality of discrete spires extending from the interior surface.

In a twelfth embodiment (12), the first sub-pack according to any one of embodiments (1)-(11) comprises a first venting bay and the second sub-pack according to any one of embodiments (1)-(11) comprises a second venting bay, and the first sub-pack is coupled to the second sub-pack such that the first venting bay and the second venting bay define a vent compartment.

In a thirteenth embodiment (13), the electric vehicle battery pack according to the twelfth embodiment (12) further comprises a vent valve disposed in the vent compartment.

In a fourteenth embodiment (14), the first sub-pack according to any one of embodiments (1)-(13) comprises a first coolant compartment formed in an exterior surface of the first sub-pack.

In a fifteenth embodiment (15), the first coolant compartment according to the fourteenth embodiment (14) comprises walls configured to direct a flow of a coolant through the first coolant compartment.

In a sixteenth embodiment (16), the electric vehicle battery pack according to the fifteenth embodiment (15) comprises a first plate attached to the walls of the first coolant compartment and to a perimeter wall of the first coolant compartment, and the first plate seals the first coolant compartment to create a closed volume for the flow of the coolant in the first coolant compartment.

In a seventeenth embodiment (17), the first plate according to the sixteenth embodiment (16) is a metal plate welded to the walls of the first coolant compartment.

In an eighteenth embodiment (18), the second sub-pack according to any one of embodiments (14)-(17) comprises a second coolant compartment formed in an exterior surface of the second sub-pack.

In a nineteenth embodiment (19), the electric vehicle battery pack according to the eighteenth embodiment (18) comprises a coolant interconnect configured to allow coolant to flow within the first coolant compartment and the second coolant compartment.

In a twentieth embodiment (20), the coolant interconnect according to the nineteenth embodiment (19) comprises a coolant inlet coupled to the first coolant compartment and the second coolant compartment, and a coolant outlet coupled to the first coolant compartment and the second coolant compartment.

In a twenty-first embodiment (21), the first coolant compartment according any one of embodiments (18)-(20) is located on a bottom side of the electric vehicle battery pack and the second coolant compartment is located on a top side of the electric vehicle battery pack opposite the first coolant compartment.

In a twenty-second embodiment (22), the first battery bay according to the twenty-first embodiment (21) comprises an interior surface juxtaposed to an interior surface of the first coolant compartment, the interior surface of the first battery bay comprising an electrical contact electrically coupled to the first set of battery cells, and the second battery bay according to the twenty-first embodiment (21) comprises an interior surface juxtaposed to an interior surface of the second coolant compartment, the interior surface of the second battery bay comprising an electrical contact electrically coupled to the second set of battery cells.

In a twenty-third embodiment (23), the interior surface of the first coolant compartment according to the twenty-second embodiment (22) comprises micro surface features formed on the interior surface.

In a twenty-fourth embodiment (24), the interior surface of the first coolant compartment according to the twenty-second embodiment (22) or the twenty-third embodiment (23) comprises a plurality of hollow protrusions extending from the interior surface of the first coolant compartment, each of the plurality of hollow protrusions extends into the first battery bay, and the first battery bay comprises a plurality of first spots in which a respective one of the battery cells in the first set of battery cells is disposed, the first spots being demarcated by protrusions comprising the plurality of hollow protrusions.

In a twenty-fifth embodiment (25), the first sub-pack according to any one of embodiments (1)-(24) comprises a first ancillary bay located adjacent the first battery bay, the second sub-pack according to any one of embodiments (1)-(24) comprises a second ancillary bay located adjacent to the second battery bay, and the first ancillary bay and the second ancillary bay define an ancillary compartment in the electric vehicle battery pack.

In a twenty-sixth embodiment (26), the ancillary compartment according to the twenty-fifth embodiment (25) comprises a battery management system controller component, an automatic disconnect device, and an active safety device, and wherein the active safety devices comprises one or more of a controller, a fuse, a pyrofuse, a contactor, a relay, a busbar, a connector, a current sensor, a voltage sensor, a high-voltage connector, a low voltage connector, or a low voltage harness.

In a twenty-seventh embodiment (27), the first sub-pack or the second sub-pack according to the twenty-fifth embodiment (25) or the twenty-sixth embodiment (26) comprises a through opening formed in a wall of the ancillary compartment.

In a twenty-eighth embodiment (28), the through opening according to the twenty-seventh embodiment (27) is configured to receive an electrical interconnect to electrically connect the electric vehicle battery pack to another electric vehicle battery pack.

A twenty-ninth embodiment (29) of the present disclosure is directed to an electric vehicle battery assembly comprising the electric vehicle battery pack according to any one of embodiments (1)-(28) as a first electric vehicle battery pack in the assembly, the first electric vehicle battery pack further comprising a first coolant compartment formed in the first sub-pack or the second sub-pack; a second electric vehicle battery pack comprising a third set of battery cells and a second coolant compartment; and a stackable architecture comprising: a first coolant interconnect coupled to the first electric vehicle battery pack and a second coolant interconnect coupled to the second electric vehicle battery pack, the first and second coolant interconnects configured to allow coolant to flow within the first coolant compartment and the second coolant compartment; and an electrical interconnect electrically connecting the first electric vehicle battery pack to the second electric vehicle battery pack, where the electrical interconnect is received within a first through opening in a bottom of the first electric vehicle battery pack and within an adjacent second through opening in a top of the second electric vehicle battery pack.

In a thirtieth embodiment (30), the first electric vehicle battery pack according to the twenty-ninth embodiment (29) comprises a first plate attached to the bottom of the first electric vehicle battery pack, where the first plate seals the first coolant compartment to create a closed volume for the flow of the coolant in the first coolant compartment, and the second electric vehicle battery pack according to the twenty-ninth embodiment (29) comprises a second plate attached to the top of the second electric vehicle battery pack, where the second plate seals the second coolant compartment to create a closed volume for the flow of the coolant in the second coolant compartment, and the first plate is stacked on top of the second plate in the electric vehicle battery assembly.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

FIGS. 5A and 5B show an ancillary compartment with electronics in a battery pack according to some embodiments.

FIGS. 6B-6G show various configurations of a battery cell populated in a spot according to some embodiments.

FIG. 10 is a table of example specifications for a multi-chemistry, scalable electric vehicle battery according to some embodiments.

DETAILED DESCRIPTION

Figure 1A:
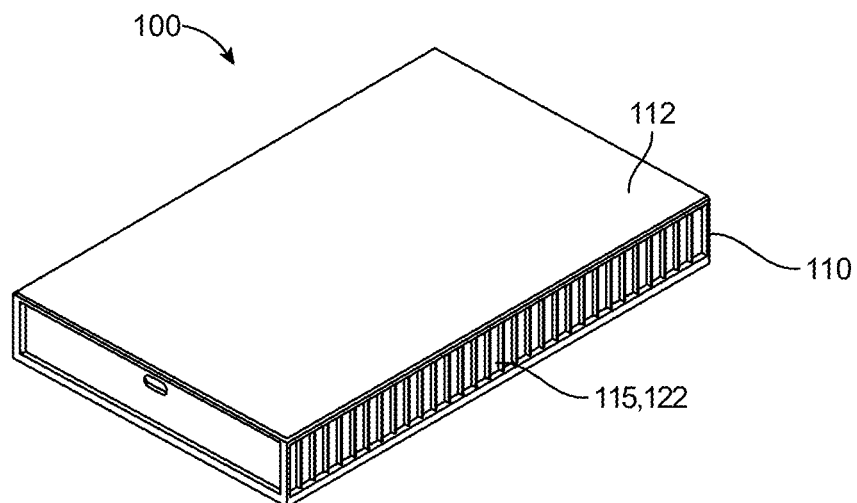
FIGS. 1A-1C show various views of a battery sub-pack according to some embodiments.

Electric vehicle battery systems disclosed herein comprise one or more electric vehicle battery packs that serve as energy storage components and comprise a metal alloy enclosure with a plurality of battery cells interconnected in series, in parallel, both, or any suitable combination thereof to deliver voltage and energy. The metal alloy enclosure can comprise multiple sub-packs each comprising a battery bay populated with a plurality of battery cells. The design of the battery packs can be interchangeable in the event of failure, damage, and/or standard maintenance. For example, a single battery pack in a battery stack or a battery system can be replaced as needed without requiring replacement of the entire battery system. Further, the battery pack architecture can be tailored and modified to any suitable vehicle application. For example, the battery packs described herein can be provided with a low-profile for a car or small truck application, or provided in a battery stack for a larger vehicle application, including a tractor-trailer or heavy equipment application.

Further, the metal alloy enclosure can comprise a thermo-structural cast metal alloy for each battery sub-pack. As described herein, these enclosures comprise a lightweight metal alloy that can provide the structure for the enclosure itself, structure for integrating electrical or thermal components of a battery pack, and/or structure for attachment of a cover plate. In some embodiments, the lightweight specialized metal alloy properties can be tailored to provide optimized thermal conductivity, stiffness, surface roughness, corrosion resistance, etc. In some embodiments, a single cast metal alloy can be machined with multiple design aspects to provide a plurality of final structural configurations without proliferating the casting die.

As described herein, the metal alloy enclosures provide for, among other things: (i) coolant compartment cover plate optimization, (ii) ancillary compartment active thermal management as single piece casting, which enables control of electronic components for better performance and higher durability, (iii) modularity in terms of symmetrical or nearly symmetrical sub-packs of the form factor to allow for ease of stacking while using significantly less fasteners than status quo design, (iv) the ability to stack enclosures while internally connecting battery cells with sealed and perforated bulkheads connecting ancillary compartments to generate larger battery pack units while maintaining singular controls and singular interface, and (v) cell-to-pack (CTP) designs that allow for high shear and torsional stiffness, which allows a battery pack to also function as a structural element during use.

In some embodiments, the electric vehicle battery systems can comprise a battery management system (BMS) comprising hardware and software operable to oversee measurement of the condition of the electric vehicle battery pack(s), the individual battery cells, or both. In some embodiments, the system can comprise sensor(s) and sensor electronics that are operable to report measurements from the electric vehicle battery pack(s), the individual battery cells, or both, to the BMS. Safety features, such as auto-disconnect devices can also be included in the system. In some embodiments, the BMS and the safety features can be in an ancillary bay or compartment that is separated from the battery cells and/or coolants necessary to maintain the thermal safety of the battery cells and the overall battery pack. For example, the BMS and safety features can be located in an ancillary bay or compartment that is separate from a battery bay or a coolant compartment. The BMS and safety features can be communicably coupled to the battery cells, associated circuitry, and sensors such that the BMS and safety features can control and monitor the battery cells from a safe location. The electric vehicle battery systems further comprise conductors to bus the current within the battery system.

In cooperation with the battery management system (BMS), the metal alloy enclosures described herein are designed with various features configured to provide an efficient cell-to-pack assembly for battery cells and advanced thermal control for the battery cells, as well as an HV-chain including current collectors and busbars. Exemplary battery cell types include, large format cylindrical cells, prismatic cells, and blade cells. As described herein, enclosures according to embodiments of the present disclosure can comprise a battery cell compartment with integrated structural features in the form of recesses or protrusions designed to position and electrically connect battery cells to the BMS. These integrated structural features provide the necessary electrical connections while improving thermal performance.

In some embodiments, the electric vehicle battery systems comprise a thermal component to thermally control the battery cells and other temperature sensitive components. According to embodiments described herein, the thermal component can comprise one or more integrated coolant compartments formed in an electric vehicle battery enclosure. In some embodiments, the one or more coolant compartments can be interconnected to provide a continuous coolant flow through a battery pack, a battery stack, or a battery system.

For example, the coolant compartment of a first battery pack, or a first battery sub-pack can be connected to the coolant compartment of a second battery pack or the coolant compartment of a second battery sub-pack. According to embodiments described herein, the design and integration of these coolant compartments can eliminate coolant flood failure modes, which are the major cause of thermal runaway in battery packs, by preventing coolant ingress to a battery cell compartment.

In some embodiments, the battery pack can comprise a venting system to provide cooling air flow either into or out of a battery pack. For example, the battery pack can comprise one or more vent compartments configured to move air through the battery pack. In some cases, a vent compartment can be formed when a first battery sub-pack having a first venting bay and a second battery sub-pack having a second venting bay are mated together to form a battery pack.

As will be appreciated by those skilled in the art, the electric vehicle battery packs can operate with multiple battery chemistries including, but not limited to nickel based cathodes, iron based cathodes, or sodium-ion batteries. For purposes of illustration, the electric vehicle battery pack(s) use, for example, 46 mm cylindrical diameter battery cells. In an exemplary embodiments, an electric vehicle battery pack can use 46x (with x ranging from 60 mm-250 mm) of any chemistry without departing from the scope of the disclosure.

Additionally, the design and architecture of electric vehicle battery packs according to embodiments described herein enable manufacturing in the same production line to improve efficient manufacturing and reduce cost of production. Because of the modular nature of the electric vehicle battery pack(s), multiple chemistries can be integrated into an overall battery system. In some embodiments, the battery cells are not off the shelf battery cells. Additionally, as will be appreciated by those skilled in the art, the battery cells used in, for example, an electric vehicle, are cylindrical cells, prismatic cells, blade cells, and pouch cells. Any of these battery cell types can be used without departing from the scope of the disclosure.

According to embodiments described herein, an electric vehicle battery pack comprises a metal alloy enclosure comprising two sub-packs with a first set of battery cells disposed within a first sub-pack and a second set of battery cells disposed within a second sub-pack. As described herein, the sub-packs form various features of an electric vehicle battery pack, including, an ancillary compartment operable to house control electronics, safety devices, and battery interfaces, (2) a battery cell compartment operable to store the sets of battery cells, (3) coolant compartments operable to allow flow of a coolant to control the temperature of the battery pack, and (4) the metal alloy enclosure forming the exterior of the battery pack, and formed by coupling the two sub-packs together. The configuration of the electric vehicle battery packs described herein allows all or a portion of these four components to be integrally formed in a single enclosure or compiled from separate enclosure components coupled together without departing from the scope of the disclosure.

In some embodiments, the first sub-pack, the second sub-pack, or both can comprise a through opening formed in a wall of the ancillary compartment. In such embodiments, the wall of the ancillary compartment can define a bulkhead for connecting battery packs in a stack as described herein. For example, the through opening can be a HV (high-voltage) port, a LV (low-voltage) port, or an access opening for a HV or a LV interface.

The control electronics, safety devices, and electric vehicle battery pack interfaces are stored in the ancillary compartment. The electric vehicle battery packs can comprise a plurality of interfaces including, for example, a high voltage (HV) interface, a low voltage (LV) interface, a communication interface, a thermal interface, and a structural interface. In some embodiments, one or more of the interfaces can be combined, for example, the LV and communication interfaces can be combined, or the LV and HV communication interfaces can be combined. In some embodiments, the ancillary compartment can be fully populated, for example, configured to contain the BMS, a positive contactor, overcurrent protection, and interfaces (high voltage and low voltage interfaces).

When an electric vehicle battery pack is a secondary electric vehicle battery pack in a stack of two or more battery packs the ancillary compartment can be minimally populated when, for example, the ancillary compartment is part of a stack of more than one battery pack provided either one battery pack has a fully populated ancillary compartment or the various components exist over combined ancillary compartments in a stack of battery packs, thereby providing a full complement of interfaces. Minimal components can comprise one or more charge controllers and telematics (e.g., the use of communications and information technology (IT) to transmit, store, and receive information from devices over a network). Additionally, the minimally populated ancillary compartment has additional space that can be used to add additional functionality not present in the fully populated ancillary compartment of the battery pack. Additional functionality can include, but is not limited to, charge control and telematics.

Multiple stacks can also be connected electrically in parallel within an overall system, such as a vehicle. Multiple (inter-) stacks are configurable to operate with leader-follower architecture, where one stack operates as leader and the remaining stacks follow.

Additionally, within a (intra-) stack, there is a primary battery pack with a controller, and the rest can be "secondary" battery packs that are controllable with minimally populated ancillary compartments. Within such an intrastack, there can be a primary battery pack with a controller and the remaining battery pack(s) are controlled by the primary pack.

Where multiple stacks are used, the stack-level BMS is operable to coordinate internally in a leader-follower architecture with the BMS of associated stacks so that there is a single control interface for the plurality of stacks to an external system controller. In some configurations, multiple stacks can operate with a leader-follower architecture that allows one stack to operate as a leader and the remaining stack(s) to operate as a follower.

Additional features and advantages will be set forth in the detailed description that follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The terms "comprising" and "including" are open-ended transitional phrases. A list of elements following the transitional phrase "comprising" or "including" is a non-exclusive list, such that elements in addition to those specifically recited in the list can also be present. The phrase "consisting essentially of" limits the composition of a component to the specified materials and those that do not materially affect the basic and novel characteristic(s) of the component. The phrase "consisting of" limits the composition of a component to the specified materials and excludes any material not specified.

As used herein, unless specified otherwise, references to "first," "second," "third," "fourth," etc. are not intended to denote order, or that an earlier-numbered feature is required for a later-numbered feature. Also, unless specified otherwise, the use of "first," "second," "third," "fourth," etc. does not necessarily mean that the "first," "second," "third," "fourth," etc. features have different properties or values.

Turning to FIGS. 1A-1J, these figures show various views of a battery sub-pack 100 according to some embodiments. Sub-pack 100 can be any battery sub-pack described herein, for example sub-pack 100 can be a first sub-pack 114 and sub-pack 100 can be a second sub-pack 120. As described herein, multiple sub-packs 100, for example, first sub-pack 114 and second sub-pack 120 can be assembled and coupled together to form a battery pack (for example, battery pack 200 in FIG. 2A). That said, in some embodiments, a sub-pack 100 can also stand on its own as a smaller battery pack.

Battery sub-pack 100 comprises a metal alloy enclosure 110 (e.g., a first metal alloy enclosure of the first battery sub-pack 114), a battery bay (e.g., a first battery bay of the first battery sub-pack 114), and battery cells 150 disposed within the battery bay.

Figure 2A:
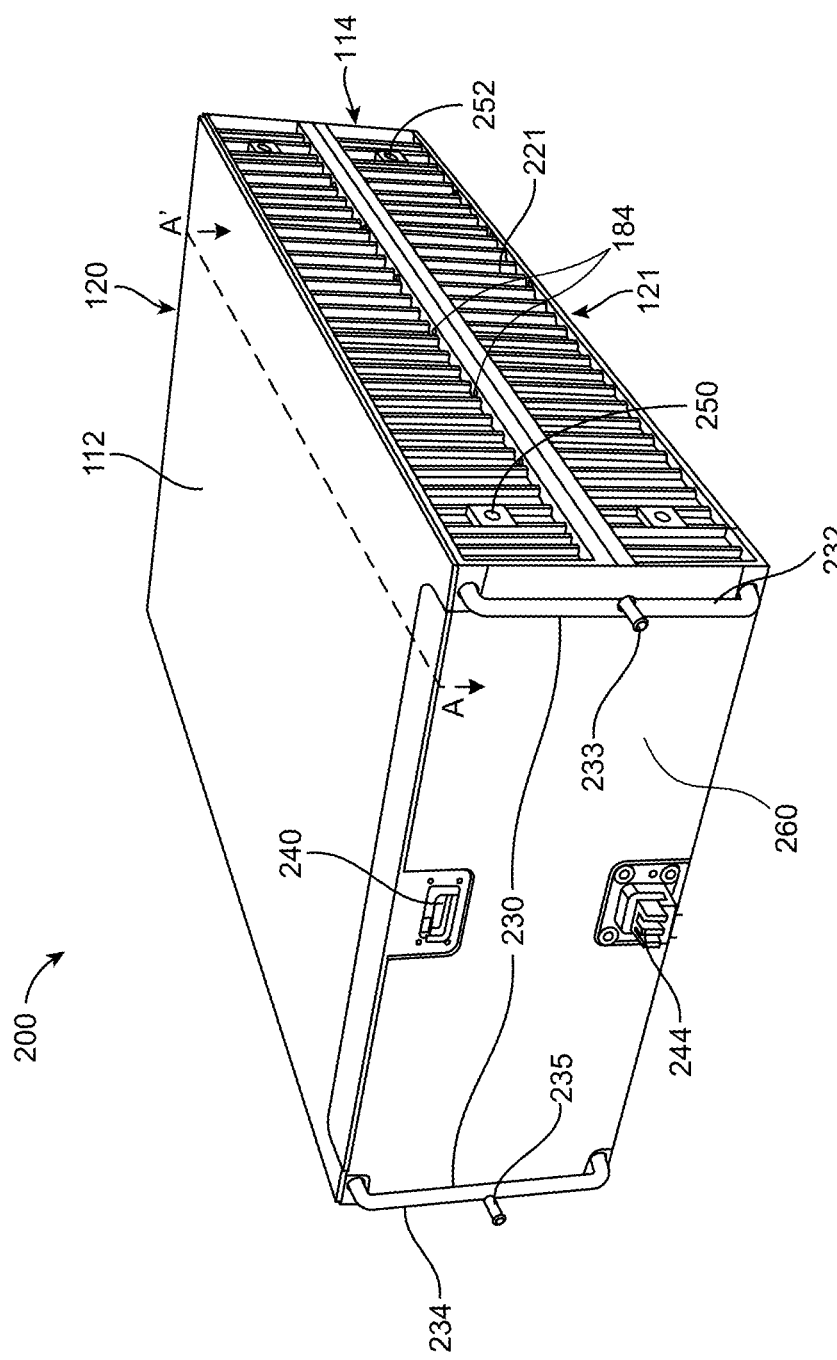
FIGS. 2A-2C show various views of an electric vehicle battery pack according to some embodiments.
Figure 3A:
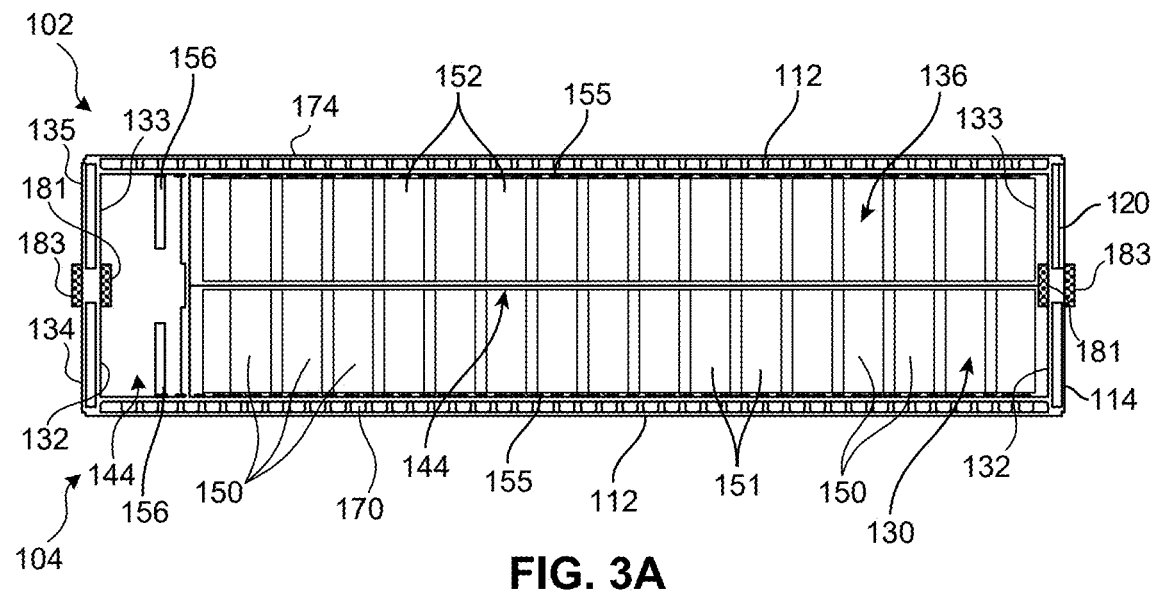
FIG. 3A shows cross-sectional view of an electric vehicle battery pack along the line A-A' in FIG. 2A.

When assembled, as shown for example in FIGS. 2A and 3A, an electric vehicle battery pack 200 can comprise a first battery sub-pack 114 comprising a first metal alloy enclosure 110 comprising a first battery bay 130 and a first set of battery cells 151 disposed within the first battery bay 130, and a second battery sub-pack 120 comprising a second metal alloy enclosure 110 comprising a second battery bay 136 and a second set of battery cells 152 disposed within the second battery bay 136. And when assembled, the first battery sub-pack 114 can be coupled to the second battery sub-pack 120 such that the first battery bay 130 and the second battery bay 136 define a battery cell compartment 140 comprising the first set of battery cells 151 and the second set of battery cells 152. Collectively, the first set of battery cells 151 and the second set of battery cells 152 are battery cells 150 housed by battery pack 200. In some embodiments, the first set of battery cells 151 can be inverted (i.e., upside-down) relative to the second set of battery cells 152 in the battery cell compartment 140.

As shown in FIG. 2A, when assembled, the sub-packs 114, 120 can be placed together facing each other such that the interior of each of the two sub-packs 114, 120 faces each other to define an interior cavity comprising a battery cell compartment 140 and an ancillary compartment 144.

When assembled, the enclosure 110 of battery pack 200 can be placed together like a clamshell when a first sub-pack 114 is rotated towards a second sub-pack 120 or the open top of the first sub-pack 114 is positioned adjacent the open top of the second sub-pack 120. The mating and clamshell-like arrangement allows each sub-pack of the enclosure 110, when in an assembled configuration, to include thermostructural elements adjacent at least one side of each battery cell 150. The mating and clamshell like arrangement also allows for ease of stacking battery packs while using fewer fasteners. While the number of fasteners that is used can change depending on the size of the enclosure, typically the reduction in fasteners involves the use of 50% or fewer of the fasteners used for a traditional enclosure.

A frame of sub-pack 100 can define all or a portion of exterior surfaces, interior surfaces, and bays of a sub-pack 100 as described herein. For example, first sub-pack 114 can comprise a frame 115 defining an exterior surface 116 and an interior surface 131 of sub-pack 114. Similarly, second sub-pack 120 can comprise a frame 122 defining an exterior surface 123 and an interior surface 137 of sub-pack 120. In some embodiments, the frame 115, 122 can be a single-cast metal alloy frame. For example, the first sub-pack 114 can comprise a single cast metal alloy frame 115 and the second sub-pack 120 can comprise a single cast metal alloy frame 122.

In some embodiments, the alloy for frames 115 and 122 can be an aluminum alloy, for example an A356 alloy, an A357 alloy, an A308 alloy, an A314 alloy, an A319 alloy, an A386 alloy, an A365 alloy, or a Silicon Modified Al-Alloy, such as a 400 series Al-alloy (e.g., $AlSi_{10}Mg$, $AlSi_9Mn$, $AlSi_{10}MnMg$). In some embodiments, the alloy for frames 115 and 122 can be a magnesium alloy, for example an AZ63 magnesium alloy, an AZ81 magnesium alloy, an AZ91 magnesium alloy, an AM20 magnesium alloy, an AM50 magnesium alloy, an AM60 magnesium alloy, an AE42 magnesium alloy, an AS41 magnesium alloy, a ZK51 magnesium alloy, a ZK61 magnesium alloy, a ZE41 magnesium alloy, a ZC63 magnesium alloy, an HK31 magnesium alloy, an HZ32 magnesium alloy, a QE22 magnesium alloy, a QH21 magnesium alloy, a WE54 magnesium alloy, a WE43 magnesium alloy, an AZ31 magnesium alloy, an AZ61 magnesium alloy, an AZ80 magnesium alloy, a ZK60 magnesium alloy, an MIA magnesium alloy, an HK31 magnesium alloy, an HM21 magnesium alloy, a ZE41 magnesium alloy, a ZC71 magnesium alloy, a ZM21 magnesium alloy, an AM40 magnesium alloy, a K1A magnesium alloy, an M1 magnesium alloy, a ZK10 magnesium alloy, a ZK20 magnesium alloy, a ZK30 magnesium alloy, or a ZK40 magnesium alloy.

In some embodiments, at least one sub-pack 114, 120 of a battery pack 200 can have a corrugated surface 221 on the frame 115, 122 (shown for example in FIG. 2A). In such embodiments, the corrugated surface 221 can be shaped into alternate ridges and grooves. The ribs or corrugated surface 221 can increase the stiffness of the overall battery enclosure 110 while reducing the mass of the battery pack 200.

In some embodiments, a plurality of structural interface features 250, 252 can be provided on each side of the enclosure 110. For example, each sub-pack 114, 120 of the enclosure 110 can have a structural interface feature 250, 252 at a first end and a structural interface feature 250, 252 at a second end as illustrated in FIG. 2A. Structural interface features 250, 252 can comprise holes, inserts, washers, fasteners, or similar mechanical components for structurally mounting packs 200 to equipment during use.

Figure 1B:
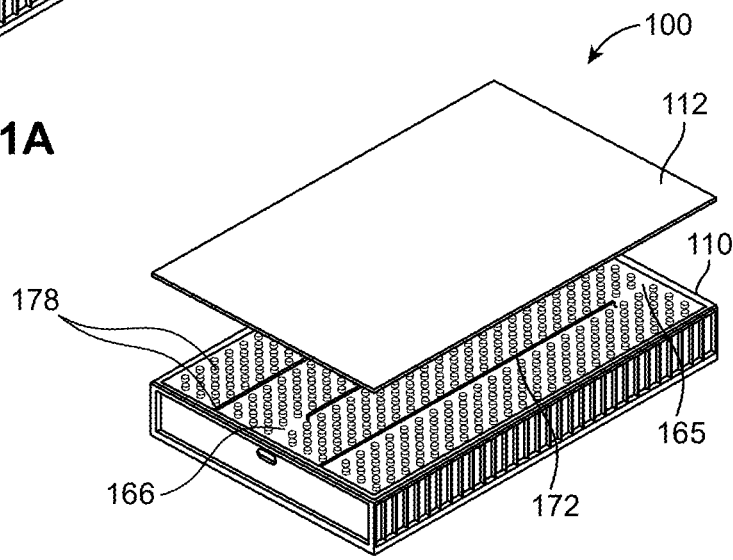

As shown in FIG. 1A, battery sub-pack 100 can comprise a cover plate 112 secured to frame 115, 122. In some embodiments, the cover plate 112 can be removable. FIG. 1B is a perspective view of battery sub-pack 100 with the cover plate 112 separated from the frame of enclosure 110. In some embodiments, the cover plate 112 can be welded to the frame as described herein. Cover plate 112 can define a portion of a coolant compartment 165 for a sub-pack 100, as described herein.

Figure 1C:
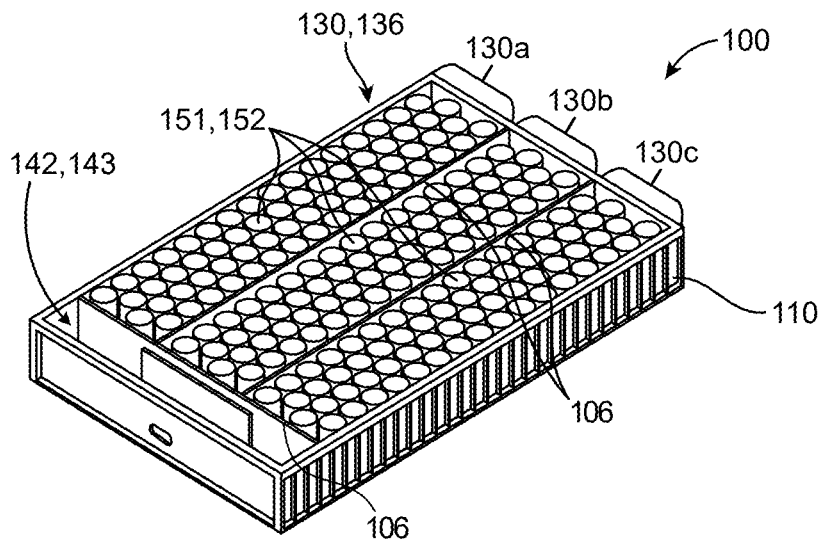

In some embodiments, from an interior view, as shown in FIG. 1C, the interior of sub-pack 100 can be organized into a plurality of battery cell sub-bays 130a, 130b, 130c, etc. In such embodiments, the battery bay 130, 136 of a sub-pack 100 can comprise the plurality of battery cell sub-bays 130a, 130b, 130c. In some embodiments, the battery cell sub-bays 130a, 130b, 130c can be demarcated by dividers 106. In some embodiments, dividers 106 can be integrally formed (for example, integrally cast) with frame 115, 122 of the sub-pack. In some embodiments, dividers 106 can be separate pieces attached to frame 115, 122, via for example, adhesive bonding or welding.

In some embodiments, the battery bay 130, 136 can be separated from additional compartments within sub-pack 100, for example, an ancillary bay as described herein. In some embodiments, the battery bays 130, 136 can be separated from additional compartments within sub-pack 100 by one or more dividers 106.

The battery cell compartment 140 of pack 200 formed by first battery bay 130 and second battery bay 136 is an interior section of the enclosure 110 where the active energy is stored. The battery cell compartment 140 can contain an array of battery cells 150 (i.e., first set 151 and second set 152) connected to an HV-chain assembly.

In some embodiments, the overall dimensions of the battery sub-pack 100 can have: a length up to 2000 mm, a width up to 800 mm, and a height up to 500 mm. As shown, in some embodiments, three or more battery cell sub-bays 130a, 130b, 130c can be positioned parallel to each other. In such embodiments, each of the three or more battery cell sub-bays 130a, 130b, 130c has a plurality of battery cells 151, 152 positioned within the battery cell sub-bays 130a, 130b, 130c. In some embodiments, a single battery sub-bay (e.g., battery sub-bay 130a) can be up to 1900 mm long×800 mm wide×500 mm high. In some embodiments, the battery bays 130, 136, collectively or individually, can hold enough battery cells 150 to achieve a system voltage of from, for example, 12 V to 1200 V. As will be appreciated by those skilled in the art, the number of battery cells 150 can vary depending on the overall battery power desired and the type of battery cell selected.

As shown in FIG. 1C, sub-packs 100 can comprise an ancillary bay adjacent to the battery bay. For example, the first sub-pack 114 can comprise a first ancillary bay 142 located adjacent the first battery bay 130 and the second sub-pack 120 can comprise a second ancillary bay 143 located adjacent to the second battery bay 136. When assembled to form battery pack 200, the first ancillary bay 142 and the second ancillary bay 143 can define an ancillary compartment 144 in the electric vehicle battery pack 200.

The ancillary bays 142, 143, and collectively, the ancillary compartment 144 provides a location for control electronics. In some embodiments, the overall dimensions of an ancillary bay 142, 143 can be: a length up to 400 mm, a width up to 800 mm, and a height up to 500 mm.

Figure 1D:
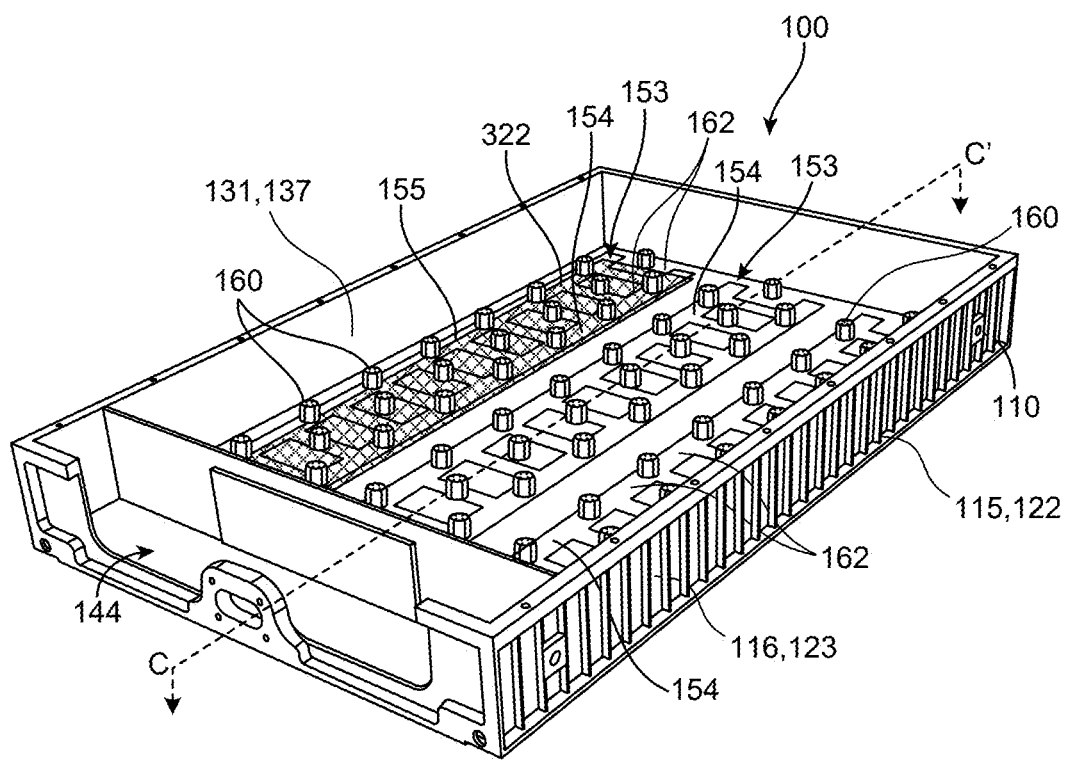
FIGS. 1D and 1E show perspective views of a battery sub-pack before being populated with battery cells according to some embodiments.

Turning to FIG. 1D, this figure shows the interior of a battery sub-pack 100 with a battery bay 130, 136, an ancillary bay 142, 143, and without the battery cells 150 installed. As shown, the interior surface 131, 137 of the battery sub-pack can have a three dimensional shape for housing battery cell sets 151, 152.

In some embodiments, a 3D surface topography of the interior surface 131 of first sub-pack 114, the interior surface 137 of second sub-pack 120, or both can comprise features configured to position battery cells 150 and electrically connect the battery cells 150 to electronics 190 in an ancillary compartment 144. In some embodiments, the 3D surface topography can comprise protrusions 160, a gully network 153, or both.

The plurality of protrusions 160 can extend from the interior surface 131, 137 of the sub-pack 100. In some embodiments, the plurality of protrusions 160 can be positioned so that two or more protrusions 160 are positioned adjacent to each battery cell 150. In some embodiments, the protrusions 160 can be integrally formed (for example, integrally cast) with the frame 115, 122 of the sub-pack 100. In some embodiments, the protrusions 160 can be separate pieces attached to the frame 115, 122 of the sub-pack 100, via for example adhesive bonding or welding. In some embodiments, the protrusions 160 can be a plurality of discrete spires extending from the interior surface 131, 137.

Figure 3B:
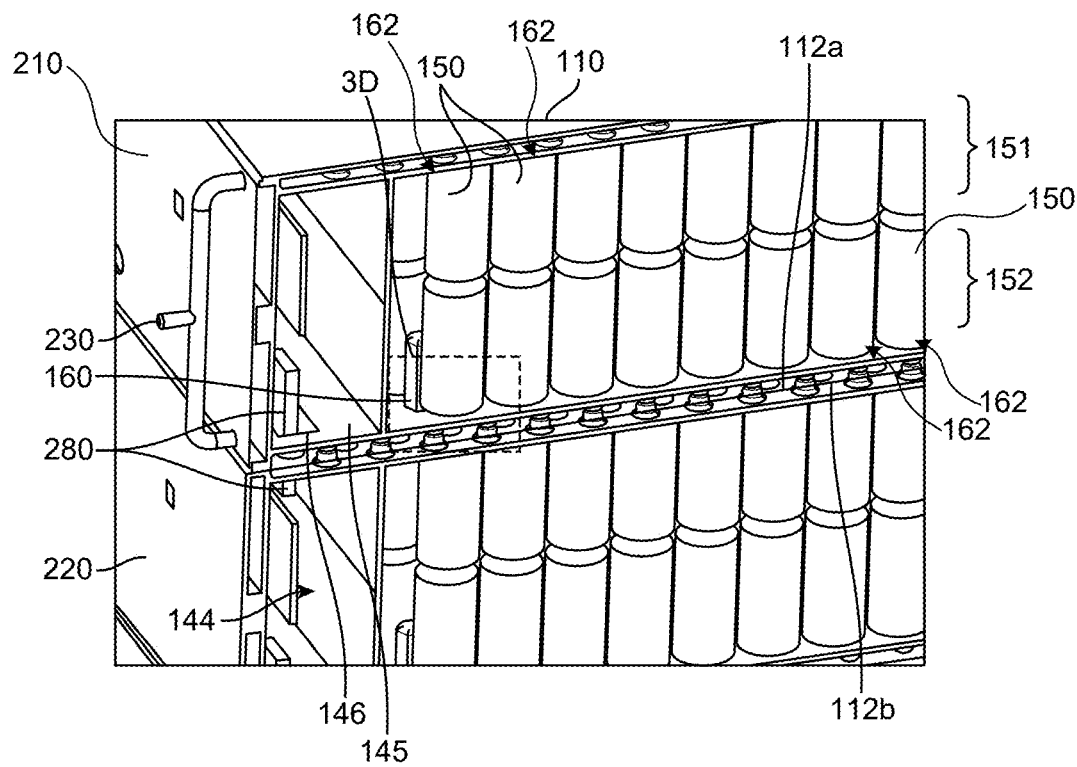
FIG. 3B shows a partial section view of two stacked electric vehicle battery packs along the line B-B' in FIG. 2D

In some embodiments, the first battery bay 130 of first sub-pack 114 can comprise a plurality of first spots 162 in which a respective one of the battery cells 150 in the first set of battery cells 151 is disposed (see for example, FIG. 3B). In such embodiments, the first spots 162 can be demarcated by a plurality of protrusions 160 extending from the interior surface 131 of the first battery bay 130. Similarly, the second battery bay 136 can comprise a plurality of second spots 162 in which a respective one of the battery cells 150 in the second set of battery cells 152 is disposed. In such embodiments, the second spots 162 can be demarcated by a plurality of protrusions 160 extending from an interior surface 137 of the second battery bay 136.

The gully network 153 can be formed on the interior surface 131, 137 of the sub-pack 100 in the form one or more recesses in the interior surface 131, 137. The gully network 153 comprises one or more gullies 154 formed in the interior surface 131, 137. In some embodiments, the gully network 153 can comprise a single continuous gully 154. In some embodiments, the gully network 153 can comprise a plurality of separate gullies 154 that, together, form the gully network 153. In some embodiments, the gully network 153 can be integrally formed (for example, integrally cast) with the frame 115, 122 of the sub-pack 100. In some embodiments, the gully network 153 can additionally or alternatively be machined into the interior surface 131, 137 of the frame 115, 122.

Each of the plurality of the spots 162 for a battery cell 151 in a first sub-pack 100 (for example, sub-pack 114) can comprise at least a portion of the gully network 153 formed in the interior surface 131 of the first battery bay 130. Similarly, each of the plurality of the spots 162 for a battery cell 152 in a second sub-pack 100 (for example, sub-pack 120) can comprise at least a portion of the gully network 153 formed in the interior surface 137 of the second battery bay 136. In some embodiments, in each spot 162, the gully network 153 can receive all or a portion of the electrical terminal for a battery cell 151, 152.

Additionally, in some embodiments, the gully network 153 for the first sub-pack 114 can receive one or more first electrical contacts 155 electrically coupled to the first set of battery cells 151. Similarly, in some embodiments, the gully network 153 for the second sub-pack 120 can receive one or more second electrical contacts 155 electrically coupled to the second set of battery cells 152. As such, when assembled, the gully networks 153 of the first and second sub-packs 114, 120 can comprise the first and second electrical contacts 155. For illustration purposes, FIG. 1D illustrates an exemplary electrical contact 155 disposed in battery bay 130, 136 with the battery cells not shown. The electrical contact(s) 155 can be electrically coupled to the battery cells' terminals.

In some embodiments, the first electrical contact(s) 155 can be electrically coupled to the first set of battery cells 151 before the battery cells 151 are installed within battery bay 130. Similarly, in some embodiments, the second electrical contact(s) 155 can be electrically coupled to the second set of battery cells 152 before the battery cells 152 are installed within battery bay 136. For illustration purposes, FIG. 3E illustrates an exemplary electrical contact 155 connected to battery cells 150 before the cells are installed in a battery bay 130, 136. Alternatively, all or a portion of the electrical contacts 155 can be installed within the gully network 153 before the battery cells 151, 152 are installed within the battery bays 130, 136.

The electrical contact 155 can be sized and shaped to cover all or a portion of the gully network 153. The electrical contact 155 can also be sized and shaped to fit around and in-between protrusions 160. In some embodiments, the electrical contact 155 can comprise cut-outs sized shaped to receive the protrusions 160.

The electrical contact(s) 155 received in the gully network 153 can electrically connect the battery cells 150 to electronics 190 in an ancillary compartment 144. For example, as illustrated in FIG. 3A, electrical contacts 155 for first sub-pack 114 and second sub-pack 120 can comprise electrical leads 156 extending into the ancillary compartment 144 and configured to connect with electronics in the ancillary compartment 144.

In some embodiments, the electrical contact(s) 155 can comprise a conductive foil operable to connect the set of battery cells 151 installed in the first battery sub-pack 114 or the set of battery cells 152 installed in the second battery sub-pack 120. Exemplary conductive foils comprise aluminum foils, copper foils, and hybrid aluminum-copper foils. In some embodiments, top and/or bottom surfaces of the conductive foil can be coated with a thin protective polymer coating.

Figure 1E:
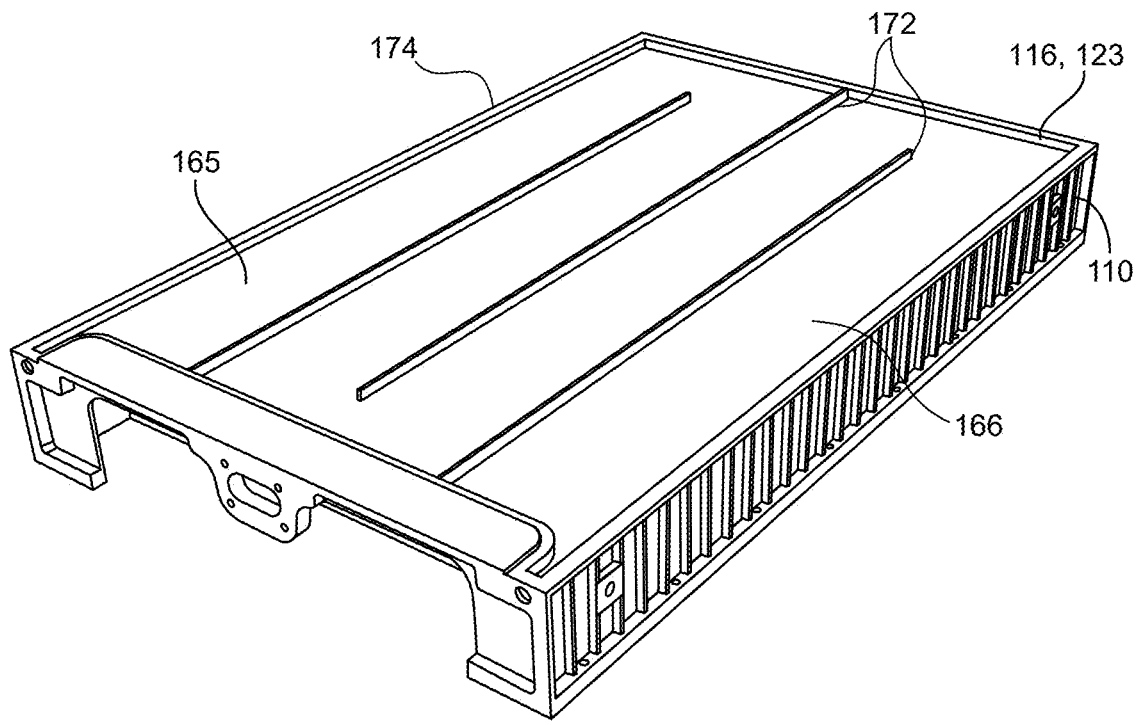

As shown in, for example, FIG. 1E, sub-pack 100 can comprise a coolant compartment 165 formed in the exterior surface 116, 123 of the enclosure 110. During use, coolant can flow to thermally control heat generated by the sub-packs 100, and therefore battery pack 200. Cover plate 112 can be provided to seal the coolant compartment 165. Suitable coolants include, for example, an automotive grade ethylene glycol water mix. The coolant can actively move throughout the coolant compartment 165. As will be appreciated by those skilled in the art, the actual temperature optimization to be achieved changes depending on the chemistry of the battery cells in the battery cell compartment. The coolant compartment 165 surface can be a singular casting that forms a specialized 3D surface operable to optimize thermal performance and uniformity of temperature control.

In some embodiments, the 3D surface topography of the coolant compartment 165 can optimize coolant flow through a battery sub-pack 100 and/or battery stack 202. For example, machining can be performed on the coolant compartment 165 surface to enable controlling coolant flow pathways as discussed below. Additional surface features can also be added, such as turbulators 178 to optimize performance of the thermal control achieved by the coolant compartment 165. The cell-to-fluid material gap can also be optimized while maintaining structural integrity of the battery sub-pack 100. In some configurations, surface roughness of the interior facing surface of the casting can vary from the ancillary compartment 144 and the battery cell compartment 140. Because the coolant material can be corrosive, an interior surface 166 of the coolant compartment can be coated with an anti-corrosive material in some embodiments to prevent corrosion.

Each battery sub-pack 100, for example first sub-pack 114 and second sub-pack 120 can comprise a coolant compartment 165 formed on the exterior surface of the sub-pack 100. For example, first-sub-pack 114 can comprise a first coolant compartment 170 formed in the exterior surface 116 of the first sub-pack 114. Likewise, second sub-pack 120 can comprise a second coolant compartment 174 formed in the exterior surface 123 of the second sub-pack 120.

In some embodiments, the first coolant compartment 170, the second coolant compartment 174, or both can comprise walls 172 configured to direct a flow of the coolant through the first coolant compartment 170 and/or the second coolant compartment 174. In some embodiments, the walls 172 comprise a perimeter wall 173 bounding a perimeter of the coolant compartment on the exterior surface of the sub-pack. FIGS. 3F-3H show some exemplary configurations for walls 172 that create coolant flow paths for a coolant compartment according to some embodiments.

In some embodiments, a first cover plate 112 can be attached to the perimeter wall 173 of the first coolant compartment 170 to seal the first coolant compartment 170 and create a closed volume for the flow of the coolant in the first coolant compartment 170. Likewise, in some embodiments, a second cover plate 112 can be attached to the perimeter wall 173 of the second coolant compartment 174 to seal the second coolant compartment 174 and create a closed volume for the flow of the coolant in the second coolant compartment 174. In some embodiments, the first cover plate 112 can also be attached to walls 172 of the first coolant compartment 170. Likewise, the second cover plate 112 can be attached to walls 172 of the second coolant compartment 174.

In some embodiments, first and second plates 112 can be attached to walls of the first and second coolant compartments 170, 174, respectively, via adhesive bonding. In some embodiments, first and second plates 112 can be metal plates attached to walls of the first and second coolant compartments 170, 174, respectively, via welding. In such embodiments, the first and second plates 112 can comprise weld lines 176 corresponding to the locations of walls 172, as shown for example in FIG. 2C.

When first sub-pack 114 and second sub-pack 120 are assembled as shown for example in FIGS. 2A and 3A, first coolant compartment 170 can be located on a first side (for example, a bottom side 104) of battery pack 200 and second coolant compartment 174 can be located on second side (for example, a top side 102) of battery pack 200 opposite the first side.

In some embodiments, adjacent battery packs 200 in a battery pack stack 202 can share coolant through interconnected coolant compartments 165. The design of the coolant compartments 165 and interconnects as described herein allows for the battery cell compartment 140 of each pack 200 to be isolated and separated from the coolant compartments 165 so that there is no direct pathway between the compartments 140 and the coolant compartments 165, which eliminates the possibility of a coolant flood failure mode caused by coolant flooding the battery cell compartment 140. This separation of the battery cell compartment 140 from the coolant compartment 165 can also architecturally eliminate a major cause of thermal runaway in battery packs 200. What is more, the design of the coolant compartments 165 and interconnects allows for close proximity between the coolant and the battery cells 150, thereby promoting efficient thermal management of the pack 200.

Figure 2B:
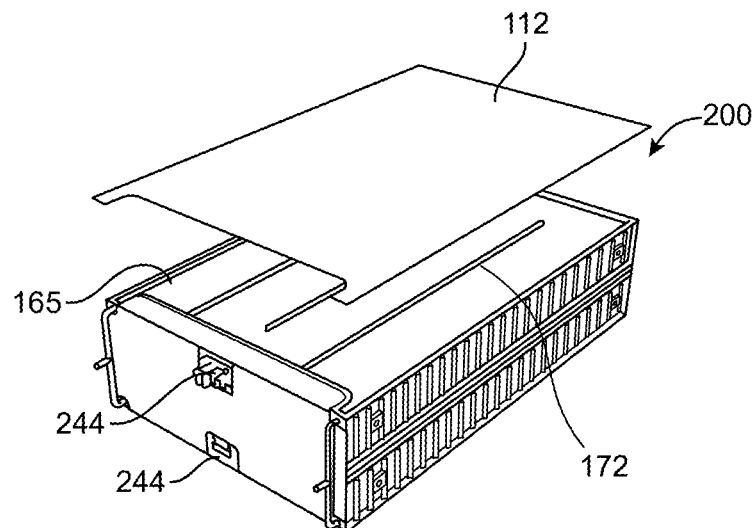
Figure 2C:
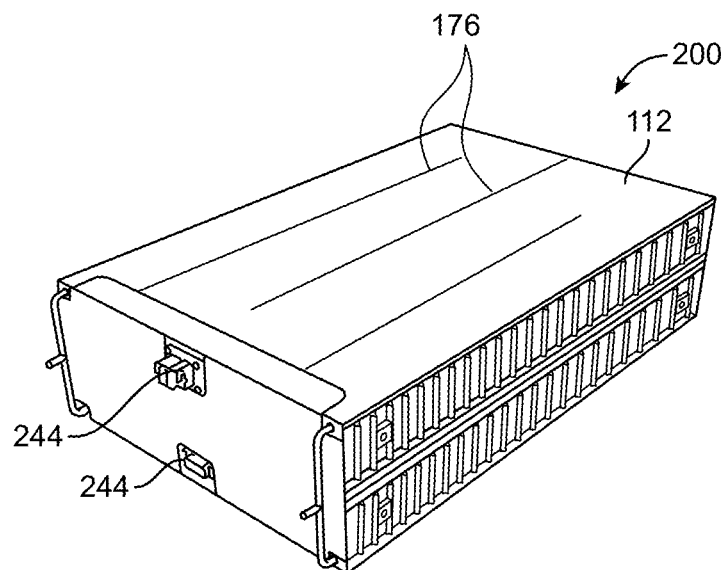
Figure 2D:
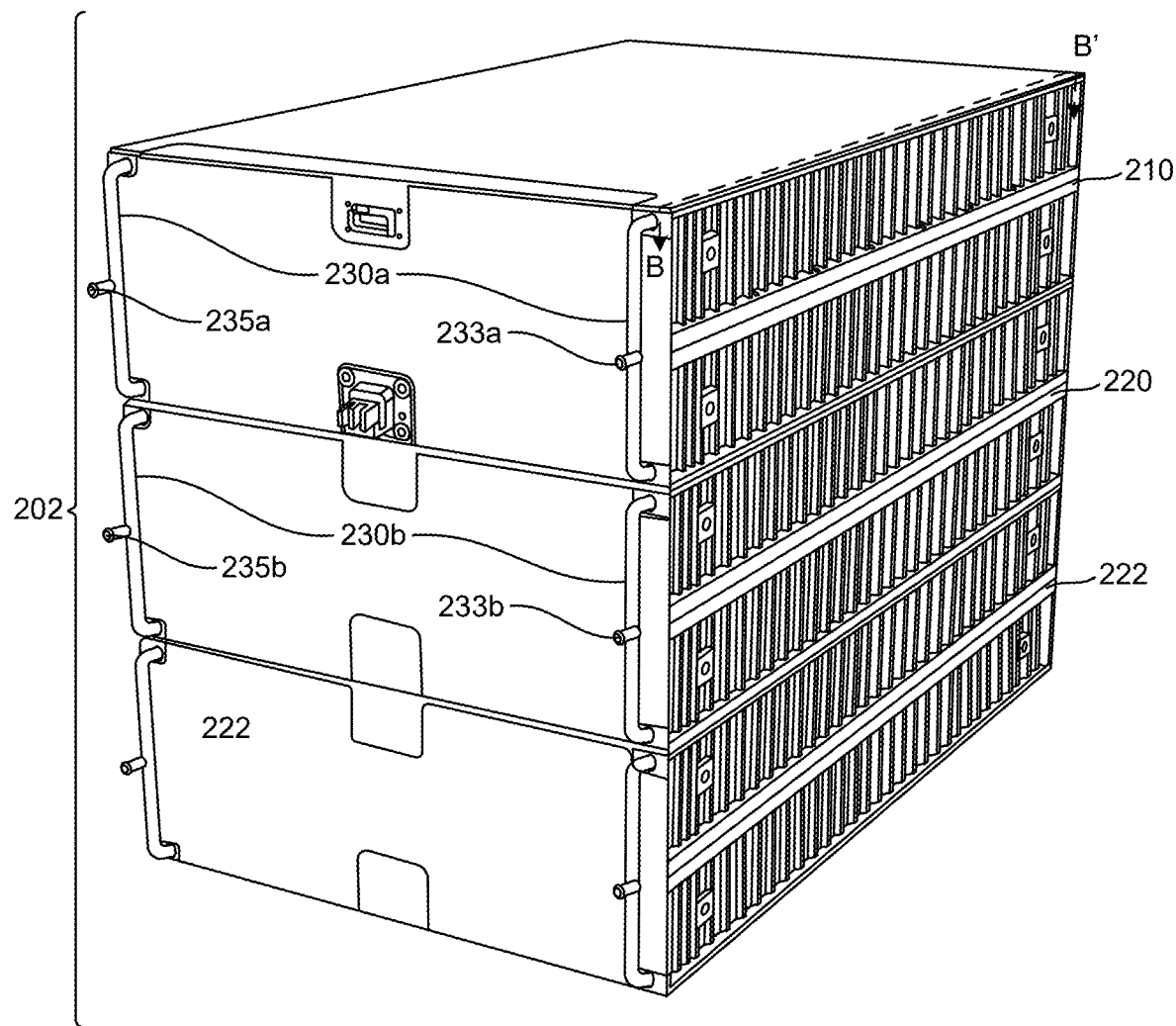
FIG. 2D shows a stack of electric vehicle battery packs according to some embodiments.

As shown for example in FIGS. 2A and 2D, interconnects 230 can provide a flowable coupling between coolant compartments 165 to provide a continuous coolant flow through a single pack 200 or through multiple packs 200 in a battery stack 202.

The coolant interconnect 230 can comprise a coolant inlet 232 coupled to the first coolant compartment 170 and the second coolant compartment 174 of a pack 200. In such embodiments, the coolant inlet 232 can comprise a first end coupled to the first coolant compartment 170, a second end coupled to the second coolant compartment 174, and an inlet coupling 233 located between the first end and the second end. Likewise, the coolant interconnect can comprise a coolant outlet 234 coupled to the first coolant compartment 170 and the second coolant compartment 174 of a pack 200. In such embodiments, the coolant outlet 234 can comprise a first end coupled to the first coolant compartment 170, a second end coupled to the second coolant compartment 174, and an outlet coupling 235 located between the first end and the second end. As such, the coolant interconnect 230 is configured to allow coolant to flow within the first coolant compartment 170 and the second coolant compartment 174.

In some embodiments, coolant inlet 232 and coolant outlet 234 of coolant interconnect 230 can be located on opposite sides (for example, right and left sides) of the face of the ancillary compartment 144. In particular, a first side of the coolant interconnect 230 (coolant inlet 232) can provide ingress of coolant to the coolant compartment 165 while the second side of the coolant interconnect 230 (coolant outlet 234) can provide an egress of coolant from the coolant compartment 165.

As shown in FIGS. 2A and 3A, in some embodiments, the first coolant compartment 170 can be located on a bottom side 104 of the electric vehicle battery pack 200 and the second coolant compartment can be located on a top side 102 of the electric vehicle battery pack 200 opposite the first coolant compartment 170. In such embodiments, coolant interconnect 230 can connect the first coolant compartment 170 on bottom side 104 to the second coolant compartment 174 on top side 102.

As shown in FIG. 2D, in embodiments comprising a stack 202 of packs 200, the stack 202 can comprise a stackable architecture comprising coolant interconnects 230 coupled to each vehicle battery pack 200 in the stack 202. For example, the stackable architecture can comprise coolant interconnects 230 coupled to at least a first electric vehicle battery pack 210 and a second electric vehicle battery pack 220 in the stack 202.

In such embodiments, a first coolant interconnect 230a can coupled to the first electric vehicle battery pack 210 and a second coolant interconnect 230b can coupled to the second electric vehicle battery pack 220. The first and second coolant interconnects 230a, 230b in the stack 202 are configured to allow coolant to flow within coolant compartments 165 within the stack 202.

For example, the coolant interconnects 230a, 230b can be configured to allow coolant flow within a first coolant compartment (e.g., compartment 170 or compartment 174) in the first electric vehicle battery pack 210 and coolant flow within a second coolant compartment (e.g., compartment 170 or compartment 174) in the second vehicle battery pack 220. As another example, the coolant interconnects 230a, 230b can be configured to allow coolant flow within (i) first and second coolant compartments (e.g., compartment 170 and compartment 174) in the first electric vehicle battery pack 210 and (ii) first and second coolant compartments (e.g., compartment 170 and compartment 174) in the second electric vehicle battery pack 220.

The plurality of coolant interconnects 230a, 230b can be coupled together via couplings 233 and 235. For example, the coolant inlet 232 of the first coolant interconnect 230a can be coupled to the coolant inlet 232 of the second coolant interconnect 230b via inlet couplings 233a, 233b on the two interconnects 230a, 230b. Similarly, the coolant outlet 234 of the first coolant interconnect 230a can be coupled to the coolant outlet 234 of the second coolant interconnect 230b via outlet couplings 235a, 235b on the two interconnects 230a, 230b.

In the stack 202, in some embodiments, the first electric vehicle battery pack 210 can comprise a first plate 112a attached to the bottom side 104 of the first electric vehicle battery pack 210 and the second electric vehicle battery pack 220 can comprise a second plate 112b attached to the top side 102 of the second electric vehicle battery pack 220 such that the first plate 112a is stacked on top of the second plate 112b in the electric vehicle battery stack 202. In some embodiments, in the stack 202, the first and second plates 112a and 112b can be omitted such that two adjacent coolant compartments in the stack 202 (for example a first coolant compartment 170 and an adjacent second coolant compartment 174) form a single coolant compartment 165.

FIG. 2B is a partial exploded view with a cover plate 112 shown separated from the coolant compartment 165. FIG. 2D shows a cover plate 112 secured to the battery pack 200. As will be appreciated by those skilled in the art, the coolant compartment 165 on an exterior facing surface of the battery pack 200, such as an exterior facing surface of a battery pack 200 in a battery pack stack 202, can have a cover plate 112 because the coolant compartment 165 is not adjacent to or formed with a coolant compartment 165 of an adjacent battery pack 200. In some embodiments, the cover plate 112 can be the largest surface of the battery pack 200 that faces an ambient environment and can be in direct conductive path of the coolant. Consequently, in some embodiments, the cover plate 112 can be thermally insulated from the ambient environment.

In some embodiments, the cover plate 112 can be a plate that will be in contact with the coolant material which can be corrosive. One or more coating layers of an anti-corrosive material can be applied on one or both sides of the cover plate 112. The cover plate 112 can be constructed to provide structural stiffness to the battery pack 200.

In some embodiments, the cover plate 112 can be assembled to the body of the battery pack to create the coolant compartment 165 via friction stir welding (FSW). The cover plate 112 material can be different or dissimilar material than the material used for the enclosure 110. For example, the material of the cover plate 112 can be lightweight and corrosion resistant. In some embodiments, the material of the cover plate 112 can be formed by stamping. The thickness of the cover plate 112 can be optimized to protect the battery pack 200 from underbody foreign object impact (e.g., where a battery pack 200 is installed in a vehicle and potentially subject to rocks or other materials impacting the exterior surface of the battery pack 200 from a road or path). In some embodiments, the cover plate 112 can comprise one or more coating layers, for example, an over-molded plastic layer, an insulating coating layer, or both, to ensure thermal insulation from the ambient environment.

As discussed herein, in embodiments comprising a stack 202 of packs 200, the stack 202 can comprise a stackable architecture that comprises an electrical interconnect 280 electrically connecting two or more packs 200 in the stack 202. For example, as shown in FIG. 3B, an electrical interconnect 280 can connect a first electric vehicle battery pack 210 to a second electric vehicle battery pack 220. In such embodiments, the electrical interconnect 280 can be received within a first through opening 146 in a bottom side 104 of the first electric vehicle battery pack 210 and within an adjacent second through opening 146 in a top side 102 of the second electric vehicle battery pack 220.

In some embodiments, the first sub-pack 114, the second sub-pack 120, or both can comprise one or more through openings 146 formed in a wall 145 of the ancillary compartment 144. In such embodiments, the through opening(s) 146 can be configured to receive an electrical interconnect 280 to electrically connect an electric vehicle battery pack 200 to another electric vehicle battery pack 200. For example, the through opening 146 can be a HV (high-voltage) port, a LV (low-voltage) port, or an access opening for a HV or a LV interface. In embodiments comprising through opening(s) 146, the wall 145 of the ancillary compartment 144 can define a bulkhead for connecting battery packs 200 in a stack 202.

In some embodiments, the location of through openings 146, ports 240, or both can be determined by machining sub-packs 100 for certain voltages and/or purposes in stack 202.

Figure 1F:
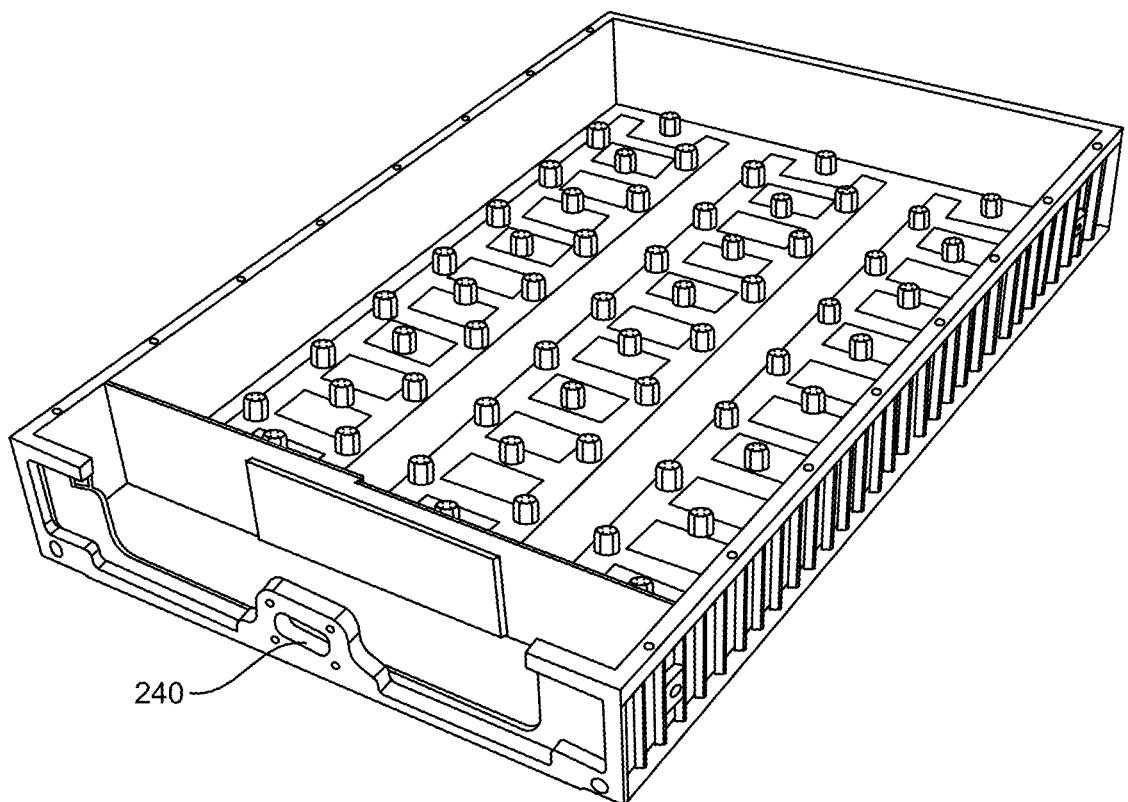
FIGS. 1F-1I show exemplary battery sub-packs machined for different electrical connectors according to some embodiments.
Figure 1G:
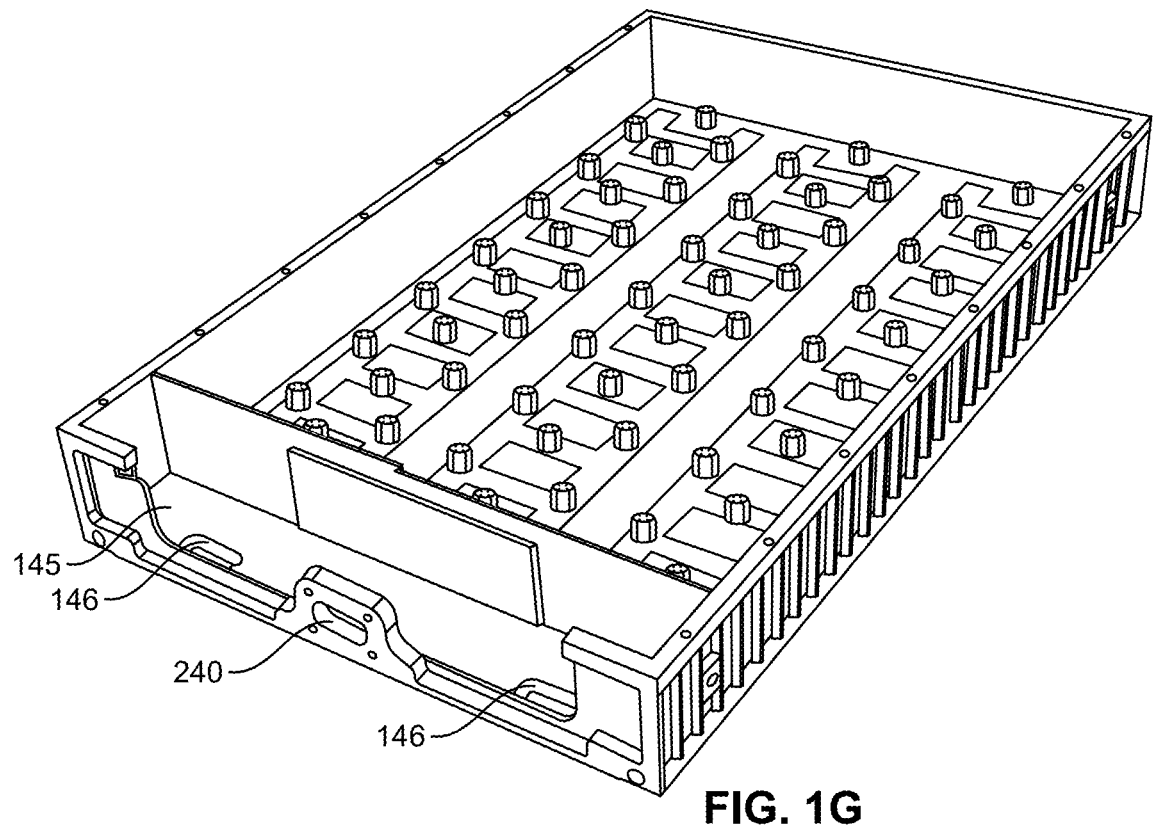

FIG. 1F shows a battery sub-pack (for example, the first battery sub-pack 114) having a machined port 240 for a high voltage connector. FIG. 1G shows a battery sub-pack (for example, first battery sub-pack 114) having a machined port 240 for a high voltage connector and openings 146 machined to provide electrical communication between an adjacent ancillary compartment 144 when battery packs 200 are stacked (see for example, FIG. 2D).

Figure 1H:
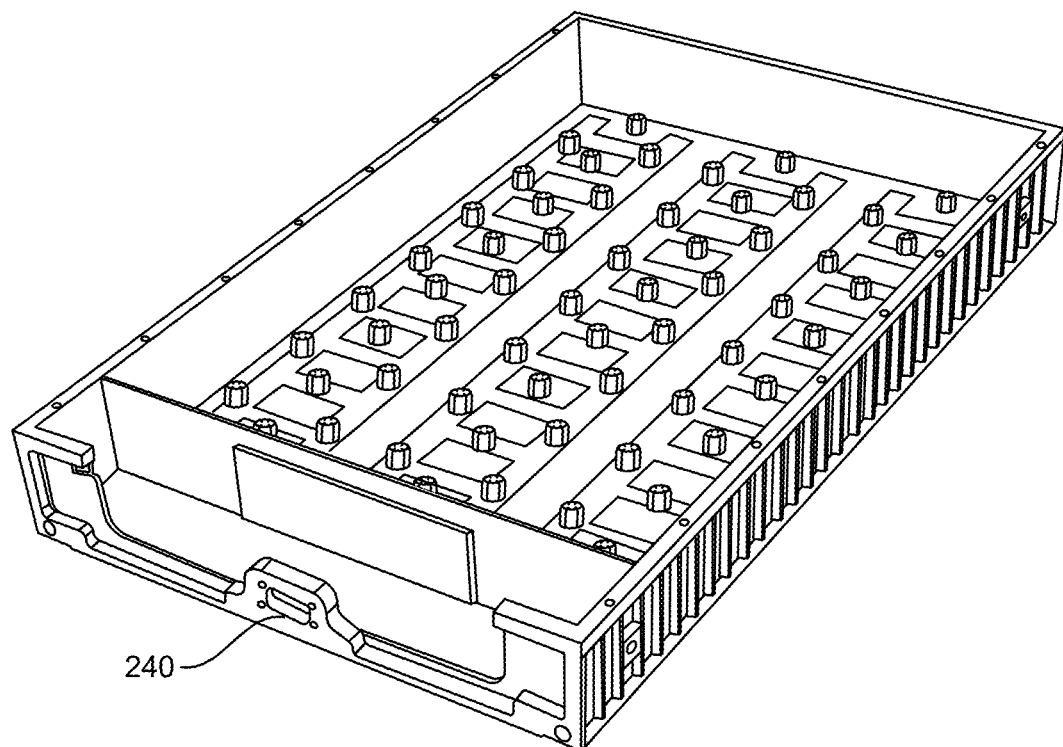
Figure 1I:
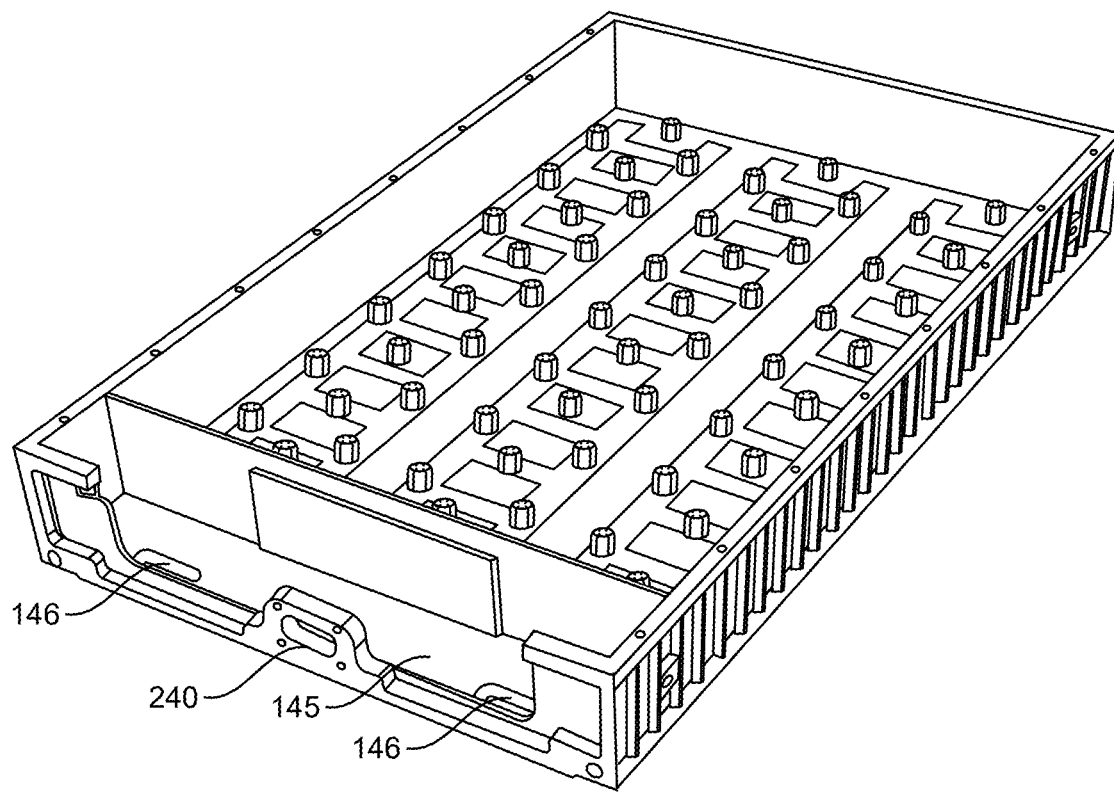

FIG. 1H shows a battery sub-pack (for example, first battery sub-pack 114) having a machined port 240 for a high voltage connector. FIG. 1I shows a battery sub-pack (for example, the first battery sub-pack 114) having a machined port 240 for a high voltage connector and openings 146 machined to provide electrical communication between the adjacent ancillary compartment 144 when battery packs 200 are compiled and stacked.

As described herein, the design of the battery pack 200 enables the battery packs to be stacked while internally connecting battery cells 150 with sealed ancillary compartments 144 resulting in larger battery pack systems capable of maintaining singular controls and a singular interface. The stacked battery packs 200 are connectable internally through the adjacent ancillary compartments 144 of respective packs 200. For example, when going from one battery pack 200 to three battery packs 200, the stacked battery packs 200 allow a battery pack stack 202 to increase from, e.g., 45 kiloWatt-hours (kWh) to 135 kWh with minimum replication of repeat components by connecting the battery packs 200 internally. As will be appreciated by those skilled in the art, the increase in kWh can change depending on the battery cell chemistry and battery pack 200 size. The architecture also allows the coolant compartments to be intimately coupled and operate with high thermal efficiency without being directly exposed to the environment or coolant contacting the battery cells.

Each sub-pack 114, 120 of the battery pack can be a single cast metal alloy that can be machined to achieve one of the four separate designs shown in FIGS. 1F-1I. The four separate machining configurations illustrated are adaptable to generate various battery packs 200 without changing a die for casting the sub-pack. Other configurations can be used without departing from the scope of the disclosure. By using a single form factor that is machined to different configurations, the cost and complexity of manufacturing sub-packs 114, 120, and therefore battery packs 200, is reduced while achieving configuration flexibility and enabling manufacturing scale.

Figure 1J:
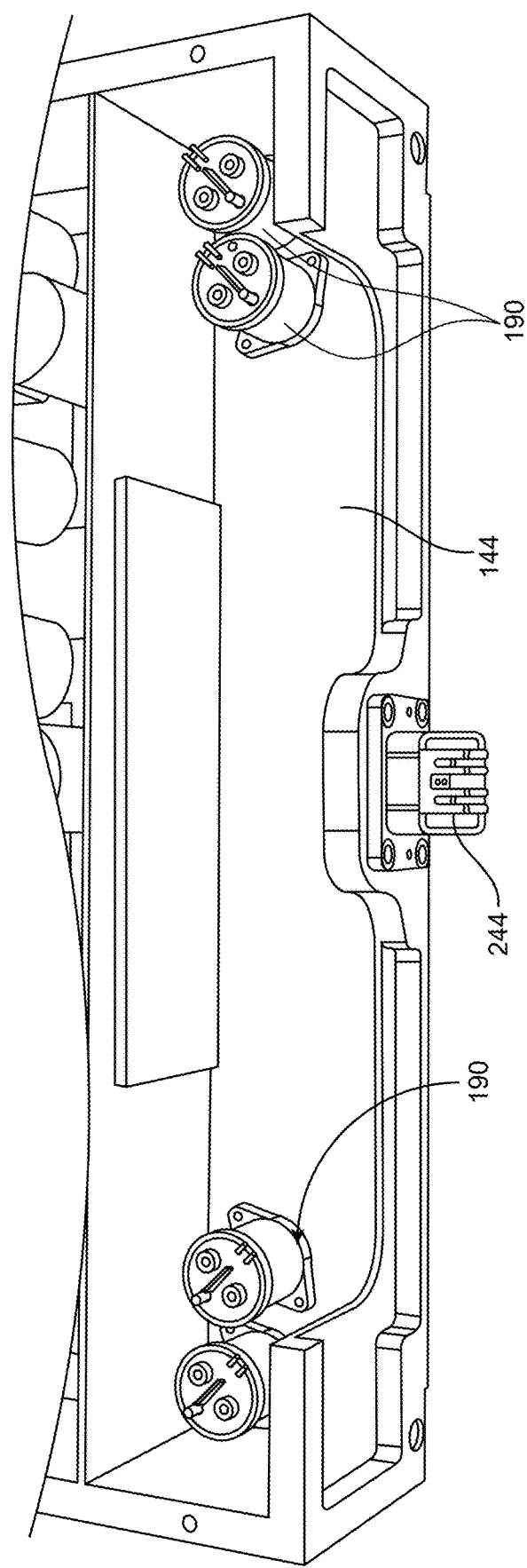
FIG. 1J shows an ancillary bay in a battery sub-pack according to some embodiments.

FIG. 1J shows the inside of the ancillary bay according to some embodiments. The ancillary bay can be a first ancillary bay 142 of first sub-pack 114 or a second ancillary bay 143 of second sub-pack 120. In some embodiments, the first sub-pack 114 can comprise a first ancillary bay 142 located adjacent the first battery bay 130, and the second sub-pack 120 can comprise a second ancillary bay 143 located adjacent to the second battery bay 136, and when the first sub-pack 114 and the second sub-pack 120 are mated, the first ancillary bay 142 and the second ancillary bay 143 can define a complete ancillary compartment 144 in the electric vehicle battery pack 200.

In some embodiments, the front face of an ancillary compartment 144 can be covered with a service panel 260 for sealing and protecting the ancillary compartment 144, as shown for example in FIG. 2A. In such embodiments, the service panel 260 can be removed to access and replace the electronics 190 housed within the ancillary compartment 144.

In some embodiments, electronics 190 can comprise control electronics, safety devices, electric vehicle battery pack interfaces, or a combination thereof. In some embodiments, the electronics 190 housed in ancillary compartment 144 can comprise a battery management system controller component, an automatic disconnect device, and an active safety device, wherein the active safety devices comprises one or more of a controller, a fuse, a pyrofuse, a contactor, a relay, a busbar, a connector, a current sensor, a voltage sensor, a high-voltage connector, a low voltage connector, a low voltage harness, or a combination thereof. In some embodiments, the electronics 190 can comprise balancing circuitry, pre-charge circuitry, or both.

In some embodiments, the ancillary compartment 144 can comprise one or more electrical interfaces 244. Interface(s) 244 can comprise, for example, a high voltage (HV) interface, a low voltage (LV) interface, or a communication interface. In some embodiments, one or more of the interfaces 244 can be combined, for example, the LV and communication interfaces. The interface(s) 244 can be received within a port 240 located on the sub-pack 100 in communication with the ancillary compartment 144. The interface(s) 244 on battery packs 200 can be in electrical communication with the electronics 190 located in the ancillary compartment 144. In some embodiments, interface(s) 244 can comprise electrical connectors (for example, a high voltage connector, a low voltage connector, or a communication connector) received within a port 240.

In some embodiments, as shown for example in FIG. 3A, an interior sidewall 132 of the first sub-pack 114 and an interior sidewall 133 of the second sub-pack 120 can be coated with a sealant 181 bonding the first sub-pack 114 to the second sub-pack 120. In some embodiments, as also shown for example in FIG. 3A, an exterior sidewall 134 of the first sub-pack 114 and an exterior sidewall 135 of the second sub-pack 120 can be coated with a second sealant 183 bonding the first sub-pack 114 to the second sub-pack 120. Additionally or alternatively, as shown for example in FIG. 2A, the first sub-pack 114 and the second sub-pack 120 can be coupled with a plurality of mechanical fasteners 184.

A group of battery packs, or battery pack stack 202, having a primary battery pack 210 and multiple secondary battery packs 220, 222 is shown in FIG. 2D. Each sub-pack 114, 120 can be substantially symmetrical or mirrored and both sides of a battery pack, and can be thermo-structural elements made of a single cast lightweight and low-carbon-footprint structural metal alloy. The plurality of battery packs 200 can form a battery pack stack 202 for a battery system. As discussed herein, the battery stack and system can share common architectural elements in design manufacturing that increases manufacturing efficiency while reducing costs. Each battery pack 200 within a battery platform or system can be a sealed mechanical assembly formed when the two battery sub-packs 114, 120 of the battery pack 200 are mated together to define the cavity forming the ancillary compartment 144 and battery cell compartment 140.

As discussed above, there can be two types of battery packs 200 in a battery pack stack 202. The primary battery pack 210 can be a single battery pack 200 that contains a fully populated ancillary compartment 144, e.g., the BMS, a positive contactor, overcurrent protection, HV interface, and LV interface. The primary battery pack 210 can also exist as a standalone battery pack 200. In some embodiments, the primary battery pack 210 can comprise an HV interface 244 and a LV interface 244 in communication with electronics located in the ancillary compartment 144.

A secondary battery pack 220 in a battery pack stack 202 can have a minimally populated ancillary compartment 144. The secondary battery back 220 can exist within a battery pack stack 202 and can also contain additional components for providing supplemental system level functionality. The battery pack stack 202 can be a mechanical assembly of more than two battery packs 200, e.g. 2-4 battery packs 200, with HV electrically in parallel within the interior of the battery packs 200. There can be one BMS, one HV interface, and one LV interface per battery stack 202. Multiple battery pack stacks 202 can also be connected electrically in parallel within an overall battery system. Where multiple battery pack stacks 202 are contained within a battery system, the stack-level BMS can coordinate internally in a leader-follower architecture such that there can be a single control interface to external system controllers.

FIG. 3A shows a side view of the interior of a battery pack with the battery cells 150 and the ancillary compartment 144 on one side. As appreciated from this view, a space or gap is located below a bottom interior surface of the battery pack 200 and the exterior of the enclosure 110. The space or gap operates as a coolant compartment 165 (for example, a first coolant compartment 170) below the entire battery pack 200. Additionally or alternatively, there can be a space or gap that operates as a coolant compartment 165 (for example, a second coolant compartment 174) above the entire battery pack 200. The configuration of the coolant compartment(s) eliminates coolant flood failure by eliminating possible coolant ingress into the battery pack 200. As will be appreciated by those skilled in the art, by separating the battery cell compartment 140 from the coolant compartment 165 during the casting, there is no pathway between the battery cell compartment 140 and the coolant compartment 165.

As shown in FIG. 3B, a partial perspective interior view of a first battery pack 200 stacked on a second battery pack 200. Each of the first battery pack 200 and secondary battery pack 200 can comprise a first set of battery cells 151 and a second set of battery cells 152 that are stacked. The battery packs are shown oriented so that the ancillary compartment 144 of each battery pack is in the same location.

Figure 3C:
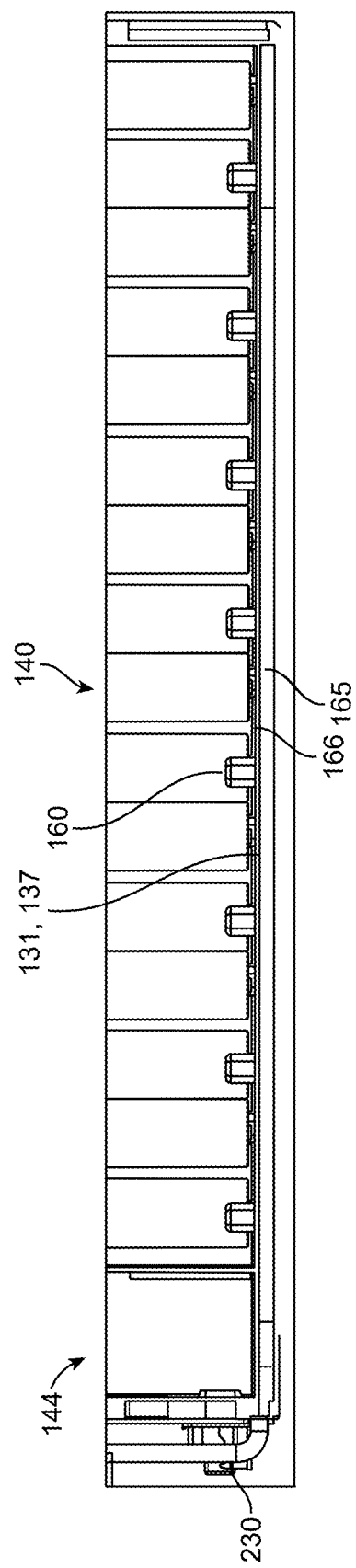
FIG. 3C shows a cross-sectional view of a battery sub-pack along line C-C' in FIG. 1D.

FIG. 3C is another cross-section of a portion of the enclosure 110 with the battery cell compartment 140 showing a plurality of protrusions 160 extending into the battery cell compartment 140 from a lower surface of the battery cell compartment 140. As shown in FIG. 3C, in some embodiments, a coolant interconnect 230 can engage the exterior of the ancillary compartment 144 at a lower end. The coolant interconnect 230 is in communication with the space between the lower surfaces of the battery cell compartment 140 and the ancillary compartment 144 and the coolant compartment 165. As will be appreciated by those skilled in the art, in the event of a failure, the solid wall between the coolant compartment 165 and the battery cell compartment 140 prevents coolant from accessing the battery cell compartment 140 or the ancillary compartment 144. Any failure would result in coolant leaking outside the enclosure 110. Thus, the configuration can eliminate coolant flood failure mode of the battery cell compartment and eliminates the major cause of thermal runaway in battery packs.

Figure 3D:
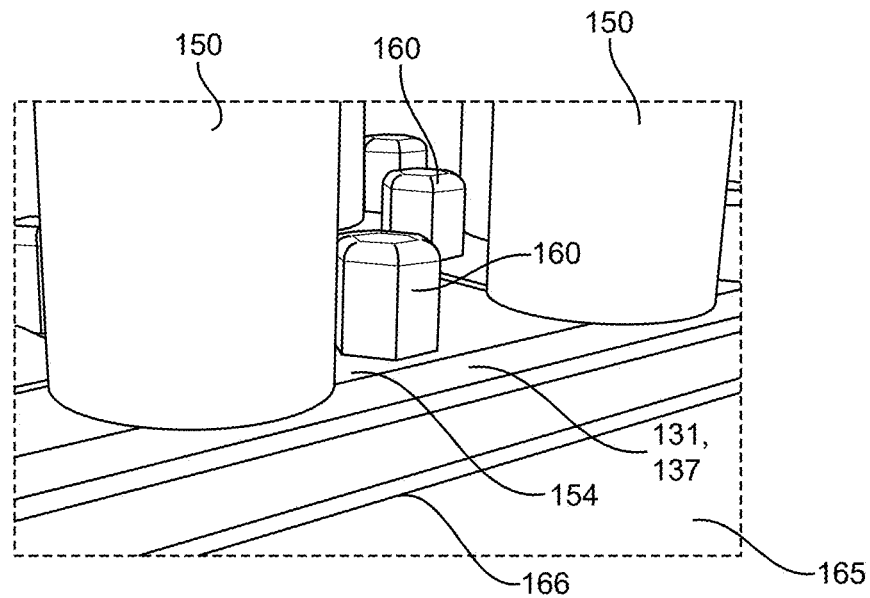
FIG. 3D shows an enlarged view of the area 3D in FIG. 3B showing battery cells populated in a battery sub-pack according to some embodiments.
Figure 3E:
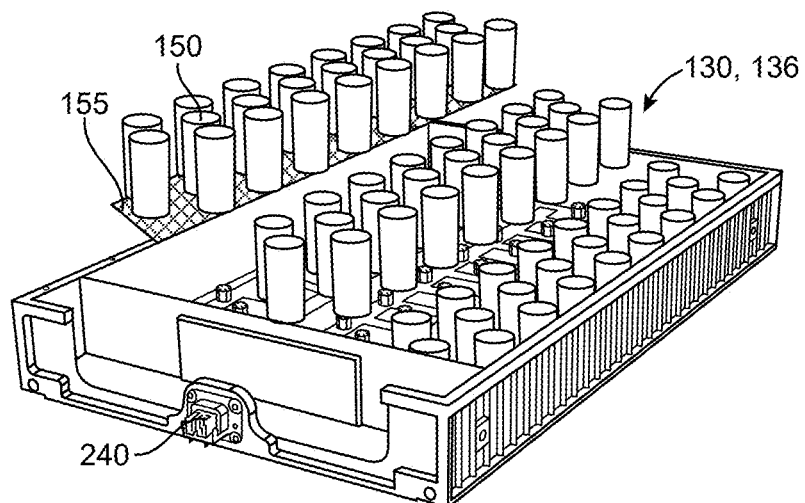
FIG. 3E shows battery cells being populated into a battery sub-pack according to some embodiments.
Figure 3H:
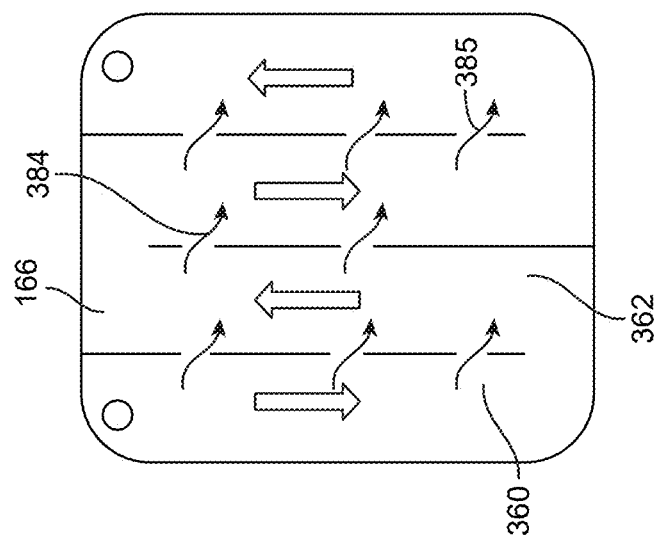
FIGS. 3F-3H show exemplary fluid flow paths for a coolant compartment according to some embodiments.
Figure 3G:
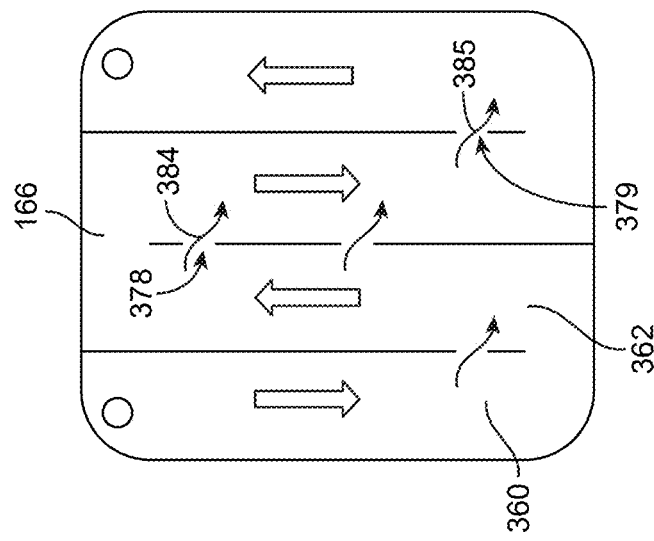
Figure 3F:
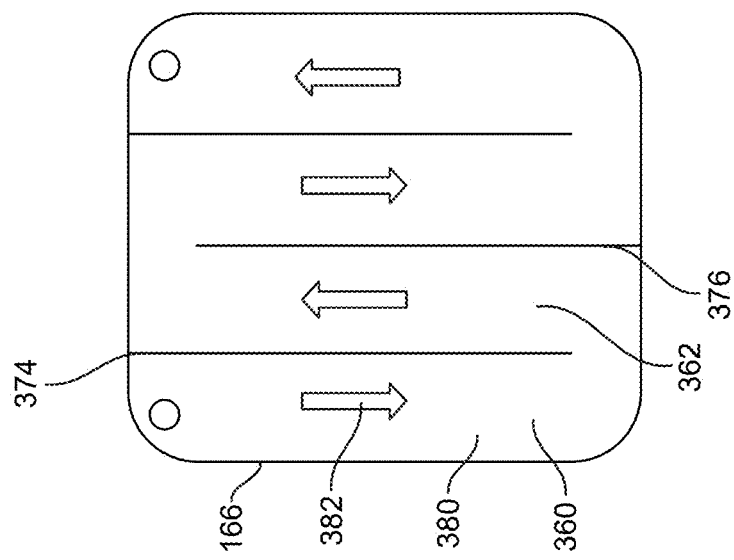

FIG. 3D shows an enlarged view of a portion of the battery pack 200 in FIG. 3B. As shown in FIG. 3D, the battery cells 150 are positioned adjacent to the protrusions 160. The interior surface 131, 137 of sub-pack 100 defining the interior of the battery cell compartment 140 is not planar and features negative recess (gullies 154) and positive protrusions 160. In some embodiments, when battery cells 150 are installed, the gullies 154 can receive all or a portion of a battery cell's electrical terminal. As described herein, such 3D surface topography of the battery cell compartment 140 enables volumetric assembly efficiency of cell-to-pack assembly for large format cylindrical battery cells. The 3D surface is also operable to provide advanced thermal cooling/heating capability for large format cylindrical battery cells and its HV-chain including current collectors and busbars.

The plurality of protrusions 160 dimensionally project into the interior cavity of the battery cell compartment 140 and are spaced to allow a battery cell 150 to be positioned within a spot 162 created between the protrusions 160. In some embodiments, the protrusions 160 can be hollow, which allows an interior cavity within the protrusion 160 to receive coolant during active thermal management.

As shown for example, in FIGS. 3C and 3D, in some embodiments, the interior surface 131, 137 of a battery sub-pack 100 can be juxtaposed to an interior surface 166 of a coolant compartment 165. For example, the interior surface 131 of first battery sub-pack 114 can be juxtaposed to an interior surface 166 of a first coolant compartment 170. Similarly, the interior surface 137 of first battery sub-pack 120 can be juxtaposed to an interior surface 166 of a second coolant compartment 174. The close proximity of interior surface 131, 137 and interior surface 166 can facilitate efficient thermal regulation of battery cells 150 with sub-packs 114, 120, and therefore battery pack 200 as a whole. FIGS. 6B-7C illustrate exemplary juxtaposed configurations for interior surfaces of a battery bay and a coolant compartment according to some embodiments.

In some embodiments, interior surface 131 of first sub-pack 114 and an interior surface 166 of first coolant compartment 170 can be opposite surfaces of a wall defined by frame 115. Similarly, in some embodiments, interior surface 137 of second sub-pack 120 and an interior surface 166 of second coolant compartment 174 can be opposite surfaces of a wall defined by frame 122.

FIGS. 3F-3H illustrate 3D surface features (walls 372) applied to the interior surface 166 of a coolant compartment 165 according to some embodiments. One or more ridges 374, 376 can be provided that alternately extend from opposing sides of the interior surface 166 to create a continuous channel 380 with parallel channels 360, 362 with a flow 382. The flow 382 in FIG. 3F can comprise a flow pattern having parallel flows 382 in alternating directions. Turning to FIGS. 3G and 3H, a series of breaks 378, 379 can be provided on one or more of the ridges 374, 376. The breaks 378, 379 can allow for a secondary flow 384, 385 from one channel to another channel at an additional transition point. The ability to modify the flow 382, 384, 385 through the channel 380 can impact the thermal effectiveness depending on the 3D geometry of the coolant compartment 165.

Figure 4:
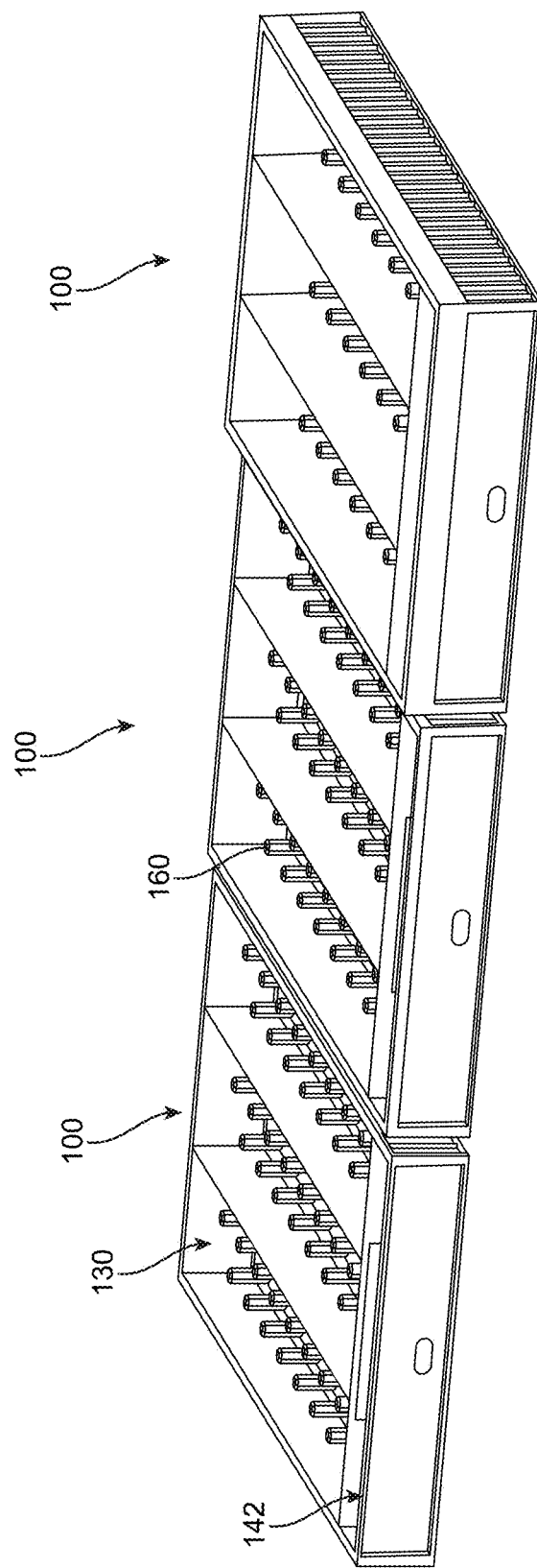
FIG. 4 shows a perspective view of multiple battery sub-packs according to some embodiments.

FIG. 4 is a perspective view of three battery sub-packs 100 positioned adjacent one another. As will be appreciated from FIG. 4, battery platform is configurable to operate with multiple heights of a 46× cylindrical cell format. The enclosing design is scalable in the Z-axis (for example, the height direction) such that the design can be scaled in height based on the height of the actual battery cell 150 to be used. Thus, the configuration can be taller or can incorporate a third casting piece as a spacer between two frames of the enclosure 110 forming a battery pack 200. Additionally, the height of the protrusions 160 (or spires) can be shorter or taller. The electrical contact 155 can also have varying thickness and is also scalable. The ancillary bay 142 is designed to accommodate electronic components to fit for the cell format as low as 4660 mm and as high as 46,250 mm.

FIGS. 5A and 5B are interior views of an ancillary compartment 144 according to some embodiments. As described herein, the ancillary compartment 144 is operable to provide active thermal management as a single piece casting that is actively thermally controlled through the coolant compartment 165. The system is capable of thermally controlling electronic performance to achieve better performance and durability of the electronic components. The ancillary compartment 144 maintains the electronics 190 with performance and durability impacted by temperature. In embodiments comprising balancing circuitry, the balancing circuitry performance can be optimized by the active thermal management because heat generated by the circuit is actively controllable by the coolant compartment 165 and other coolant features, such as a cooling plate, discussed below. The ancillary compartment 144 can also comprise 3D surface topographies similar to the 3D surface topographies used in the battery cell compartment 140.

Turning now to FIG. 5B, an example HV contactor 502, BMS circuitry 512, a busbar 522, pre-charge circuitry 532, and fins 534 are located in ancillary compartment 144. In some embodiments, the mounted BMS circuitry 512 and pre-charge circuitry can be configurable to operate as a cooling plate for the electronics. Alternatively or additionally, the pre-charge circuitry 532 can also act as a cooling plate. In some embodiments, fins 534 can be provided below the circuitry, as shown in FIG. 5B, with the fins 534 illustrated in broken lines below the pre-charge circuitry 532.

Figure 6A:
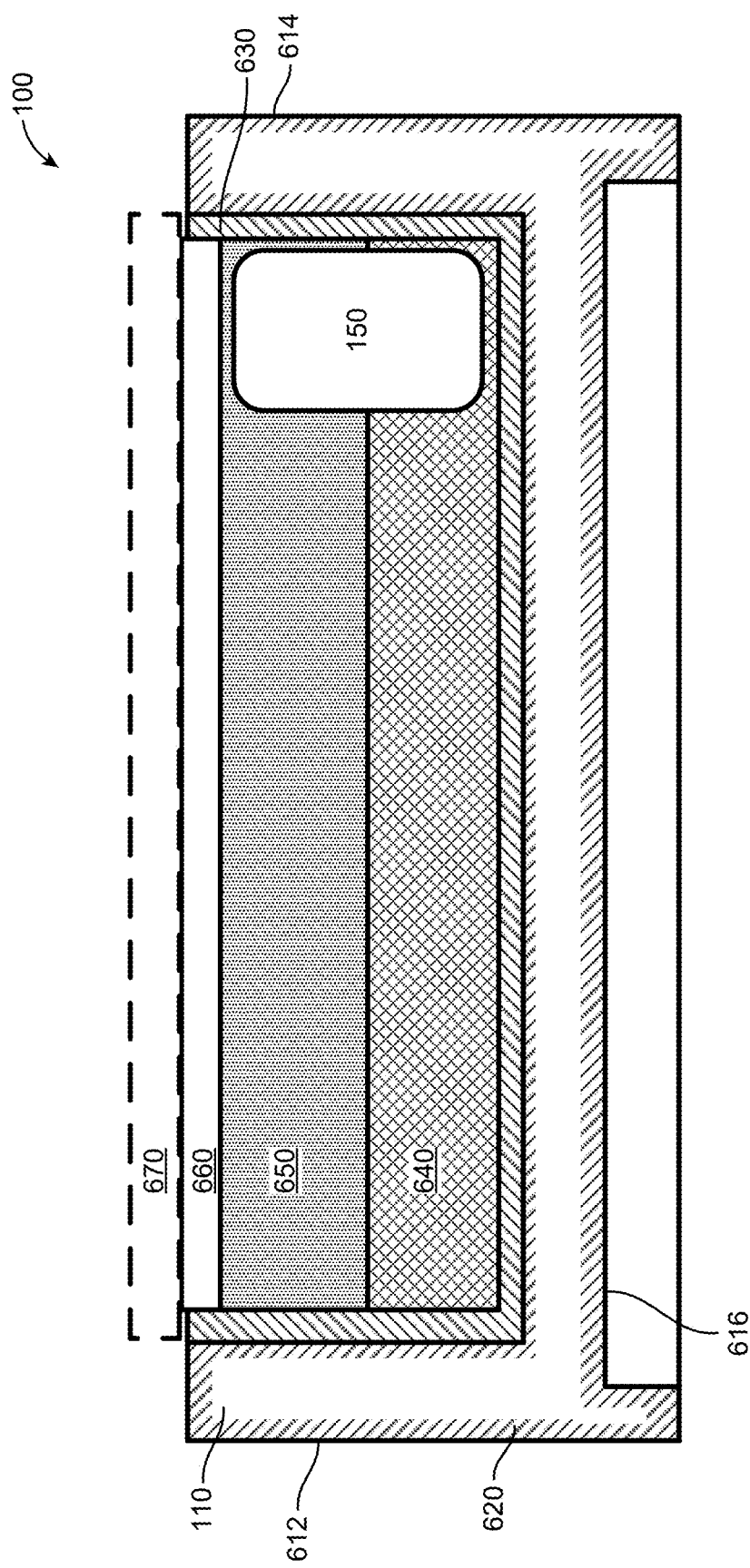
FIG. 6A shows a schematic cross-section of a battery sub-pack according to some embodiments.

In some embodiments, first battery bay 130, second battery bay 136, or both can be packed with battery cells 150 can additional coatings, layers, or a combination thereof configured to protect the battery cells 150. FIG. 6A is a functional cross-section of a battery sub-pack 100 according to some embodiments with a single battery cell 150 shown for illustration purposes. A metal alloy substrate constituting the enclosure 110 is has a first side 612, a second side 614 and a bottom side 616. A coating 620 can be provided on the surface of the enclosure 110. A dielectric insulation layer 630 can be provided on the coating 620 on the interior of the battery sub-pack 100. The enclosure 110 is a metal or metal alloy substrate that can have an anti-corrosion coating 620 applied to all surfaces (both internal surfaces and external surfaces, as shown). The anti-corrosion coating 620 has a thickness of X1. The interior surface has a dielectric insulation layer 630 with a thickness of X2 positioned on the anti-corrosion coating 620. A structural adhesive and thermal interface material 640 layer with a thickness of X3 is positioned on the dielectric insulation layer 630 so that the structural adhesive and thermal interface material 640 layer can be in contact with the dielectric insulation layer 630 on three sides in the cross-section. The structural adhesive and thermal interface material 640 layer has a further thickness of X3A for the adhesive height on the battery cell and X3B for the bond gap to cell. A thermo-structural encapsulant compound 650 layer is positioned on the structural adhesive and thermal interface material 640 layer so that one surface of the thermo-structural encapsulant compound 650 is adjacent the structural adhesive and thermal interface material 640 layer and the sides of the thermo-structural encapsulant compound 650 is adjacent the dielectric insulation layer 630. The thermo-structural encapsulant compound 650 layer has a thickness or depth of X4, with a potting height of X4A and a potting cover gap of X4B. A thermal runaway and arc protection barrier 660 is provided on the thermo-structural encapsulant compound 650 having a thickness of X5. One surface of the thermal runaway and arc protection barrier 660 is adjacent the thermo-structural encapsulant compound 650 layer and the sides of the thermal runaway and arc protection barrier 660 is adjacent the dielectric insulation layer 630. Lastly, an air gap 670 can be provided for venting with a thickness of X6. In some embodiments, air gap 670 can be in communication with a venting compartment 900 as described herein.

As will be appreciated by those skilled in the art, depending on the application and material selection, a thickness can be zero. For example, for applications that require significant cooling the thermal interface material height would increase and the bond gap would decrease. For cell chemistries with lower thermal energy and power during thermal runaway, X5 may be thinner or non-existent. For applications in a marine environment, a thicker anti-corrosion coating, or multiple layers, may be used. As will be appreciated by those skilled in the art, the thicknesses of any layer (X1-X6) can be zero (e.g., where a layer is eliminated). Examples where a layer is adjusted based on the battery application include the following.

Example 1: Where the battery requires significant cooling, the thermal interface material height would be increased, and the bond gap would be decreased.

Example 2: Where the battery cell chemistries have a lower thermal energy and power during thermal runaway, the thickness of X5 may be thinner or non-existing (e.g., the layer may be eliminated).

Example 3: For batteries that will be used in a "marine" environment, the thickness of the anti-corrosion coating may be increased or multiple anti-corrosion layers may be used for additional anti-corrosive protection.

The overall architecture benefits from the use of a single production line during manufacturing with an adjustment of materials or thicknesses to optimize the manufactured product performance for the application.

FIGS. 6B-F illustrate a variety of enclosure-coolant-battery arrangements. As will be appreciated by those skilled in the art, any one or combination of the structural changes shown can be used to optimize the thermal management performance, enclosure mass, surface area and manufacturing cost. In FIG. 6B the battery cell 150 is positioned in a spot 162 within the enclosure on an electrical contact 155. The spot 162 is part of the enclosure and is positioned above the space or gap that operates as a coolant compartment 165. A protrusion 160 is provided on either side of the battery cell 150. In operation, the protrusions can be operable as spacers to displace volume and drive a thermal interface material 640 higher on the battery cell 150 and increase thermal interface surface area.

In FIG. 6C short protrusions 160 are provided that are formed integrally with the spot 162. The integrally formed protrusions 160 are cast from the same material as the enclosure from material with high thermal conductivity. The increase in the thermal interface surface area reduces the CF (cell-to-fluid) thermal resistance, which is the thermal impedance from the cell terminal to coolant). The lower the resistance, the easier it is to approximate the cell temperature to the temperature of the coolant fluid. The higher the resistance, the more difficult it is to thermally control.

Figure 6E:
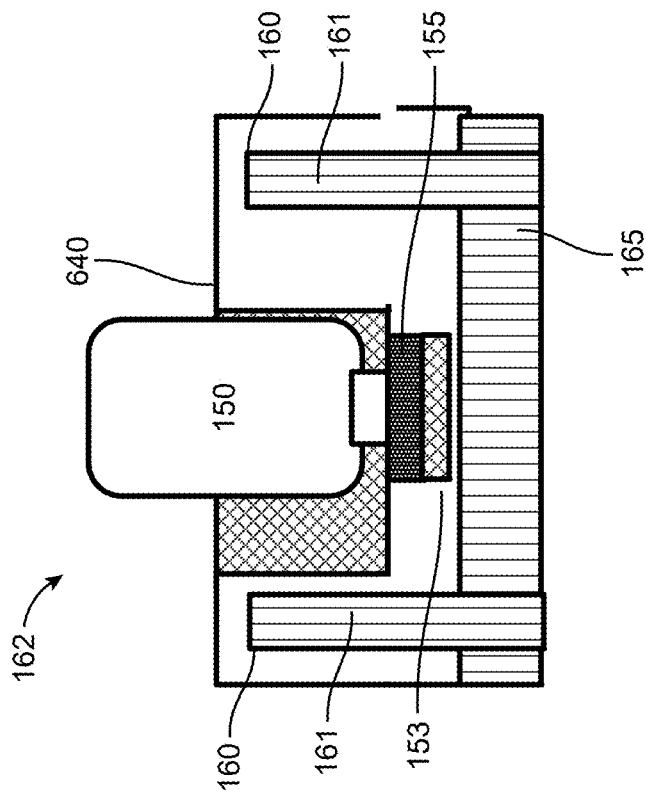
Figure 6D:
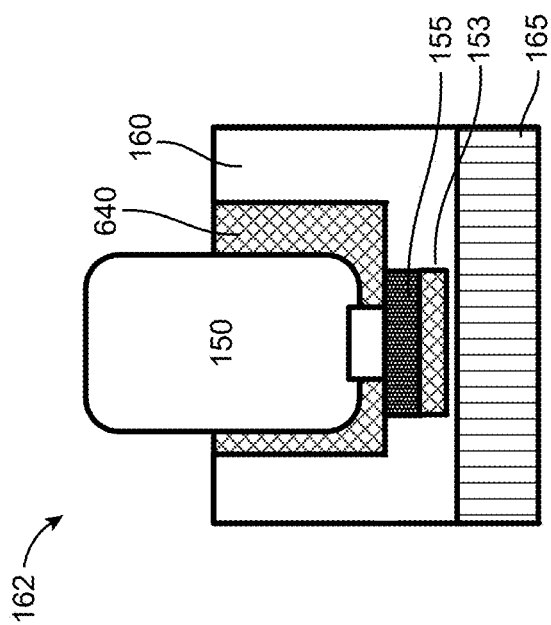

FIG. 6D illustrates integrally formed protrusions 160 that are higher than the protrusions shown in FIG. 6C. Increasing the height of the protrusions 160 decreases the cell-to-fluid thermal resistance further.

Turning to FIG. 6E, in some embodiments, protrusions 160 can be hollowed to form a cavity 161 within the hollow protrusion 160 that is in fluid communication with the coolant compartment 165 to allow coolant to pass into the interior of the protrusion. This can further decrease the cell-to-fluid thermal resistance. In such embodiments, the interior surface 166 of a coolant compartment 165 can comprise a plurality of hollow protrusions 160 extending from the interior surface 166 of the coolant compartment 165 and into a battery bay (for example, first battery bay 130 or second battery 136). By extending into the battery bay, the battery bay can comprise a plurality of spots 162 in which a respective one of the battery cells 150 is disposed, with the spots 162 being demarcated by protrusions 160 comprising the plurality of hollow protrusions 160 extending from the interior surface 166 of the coolant compartment 165. In some embodiments, a first coolant compartment 170 can comprise hollow protrusions 160 extending from the interior surface 166 of the first coolant compartment 170 and into a first battery bay 130. Additionally or alternatively, a second coolant compartment 174 can comprise hollow protrusions 160 extending from the interior surface 166 of the second coolant compartment 174 and into a second battery bay 136.

Figure 6G:
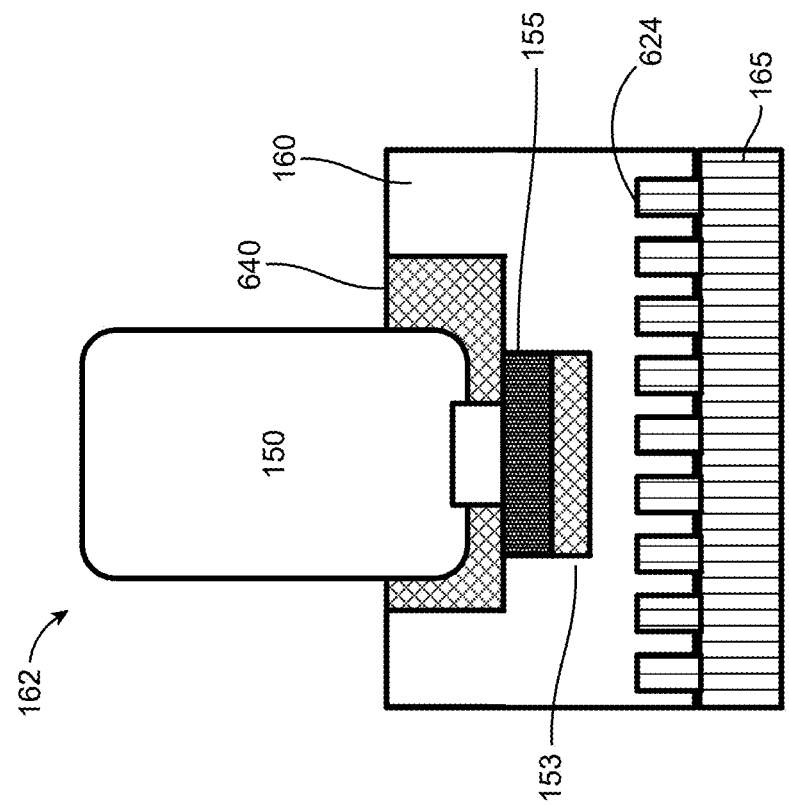
Figure 6F:
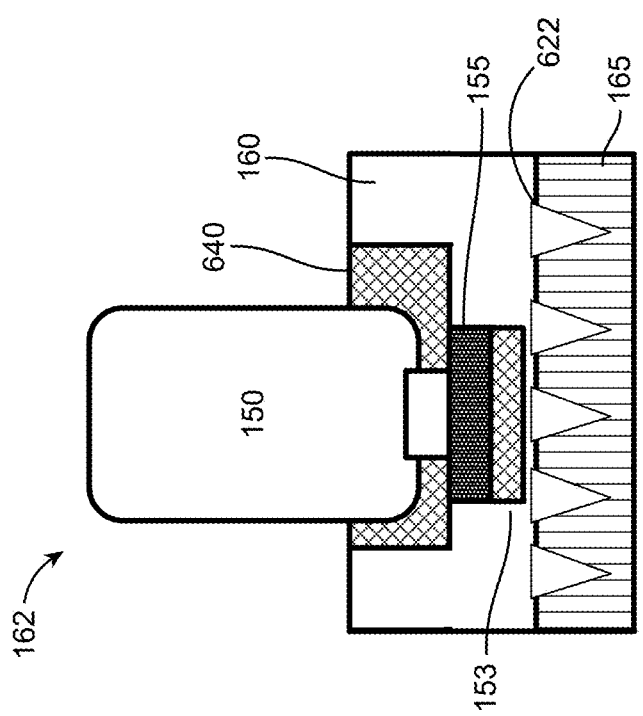

In FIG. 6F the space or gap that operates as a coolant compartment can have a series of recesses 622 that are operable as turbulators 178 further optimizing the thermal control performance of the coolant compartment. The recesses 622 are shown shaped as pyramidal micro features that increase surface area which increases turbulence of the coolant thereby increasing thermal control effectiveness. For example, recesses 622 can create a berm along which coolant can be passed in the coolant compartment (positioned below the battery cell compartment) to control battery cell temperature within an optimal operating range for a particular battery cell chemistry. Other shapes can be used without departing from the scope of the disclosure.

In FIG. 6G the cell-to-fluid material gap can be optimized while maintaining structural integrity by using micro features that reduce wall thickness locally to increase thermal effectiveness without sacrificing mechanical integrity. The micro-features are illustrated as rectangular protrusions 624 that extend into the enclosure cavity. The draft angles of the micro features can be as low as zero degrees.

In embodiments comprising micro features in the form of recesses 622, protrusions 624, or both, the micro features can be formed on the interior surface 166 of a coolant compartment. For example, a first coolant compartment 170 can comprise micro surface features formed on the interior surface 166 of the first coolant compartment 170. Alternatively or additionally, a second coolant compartment 174 can comprise micro surface features formed on the interior surface 166 of the second coolant compartment 174.

Figure 7B:
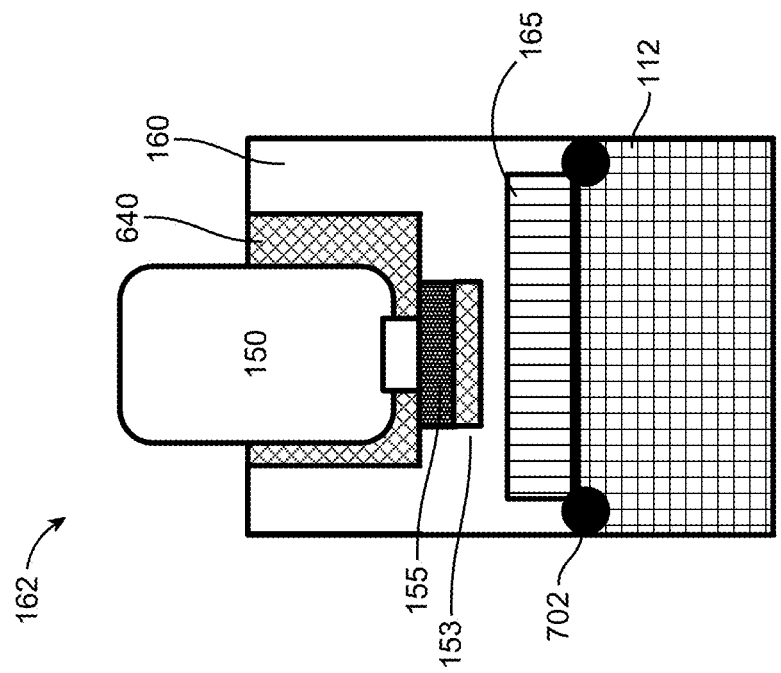
FIGS. 7A-7C show various coolant compartment configurations according to some embodiments.
Figure 7A:
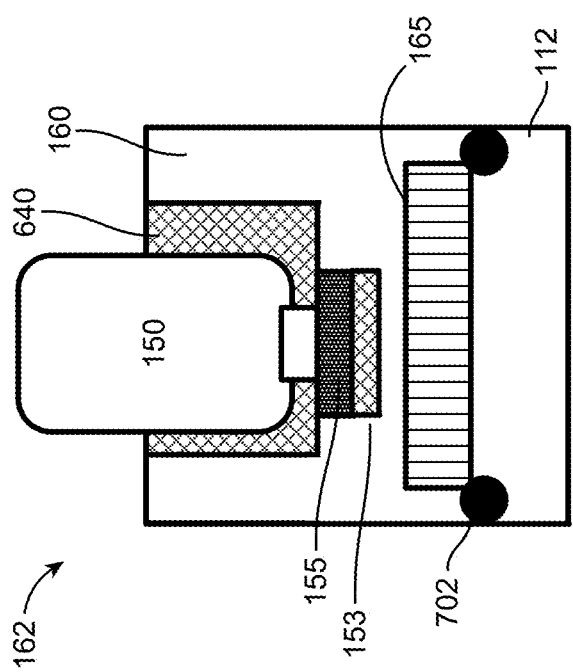
Figure 7C:
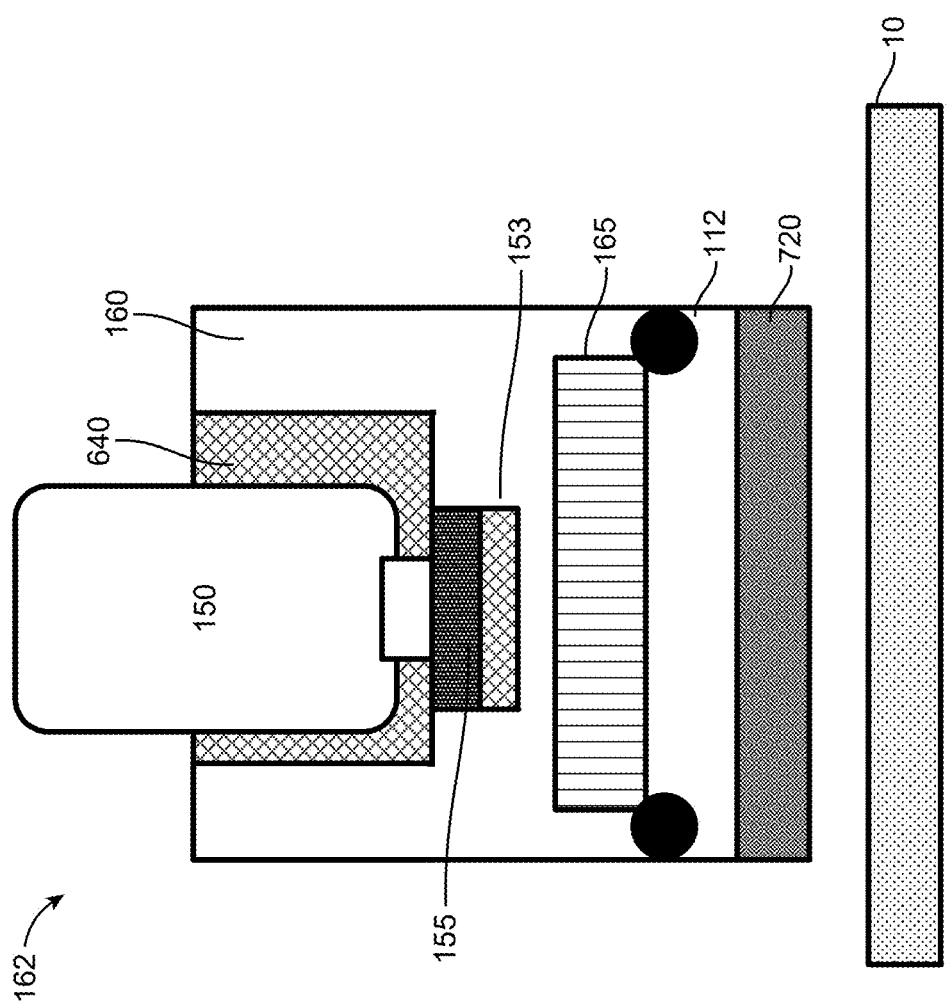

FIGS. 7A-7C illustrate coolant compartment 165 configurations according to some embodiments. In FIG. 7A, the battery cell 150 is shown with a spot 162 adjacent the cover plate 112. The friction stir welding point 702 is shown on either side of the cover plate 112. As described herein, the material of enclosure 110 and the material of cover plate 112 can be the same or different. For example, the enclosure 110 can be made from a magnesium alloy or an aluminum alloy and the cover plate 112 is can be made from the same or a different magnesium alloy or aluminum alloy. The cover plate 112 can be lightweight and corrosion resistant. Additionally, in some embodiments, the cover plate 112 can be stamped and friction stir welded.

As shown in FIG. 7B, a dissimilar material can be used as the cover plate 112 and the cover plate 112 can have a thicker dimension such that the thicker plate 112 increases protection from foreign objects that might strike a battery pack 200.

Turning to FIG. 7C, an insulating coating 720 can be applied to the cover plate 112, which is adjacent to an ambient environment 10 that can be cold or hot. As discussed above, the cover plate 112 can also have multiple laminate layers such as over-molded plastic or insulating coating to ensure thermal insulation from the ambient environment 10.

Figure 8A:
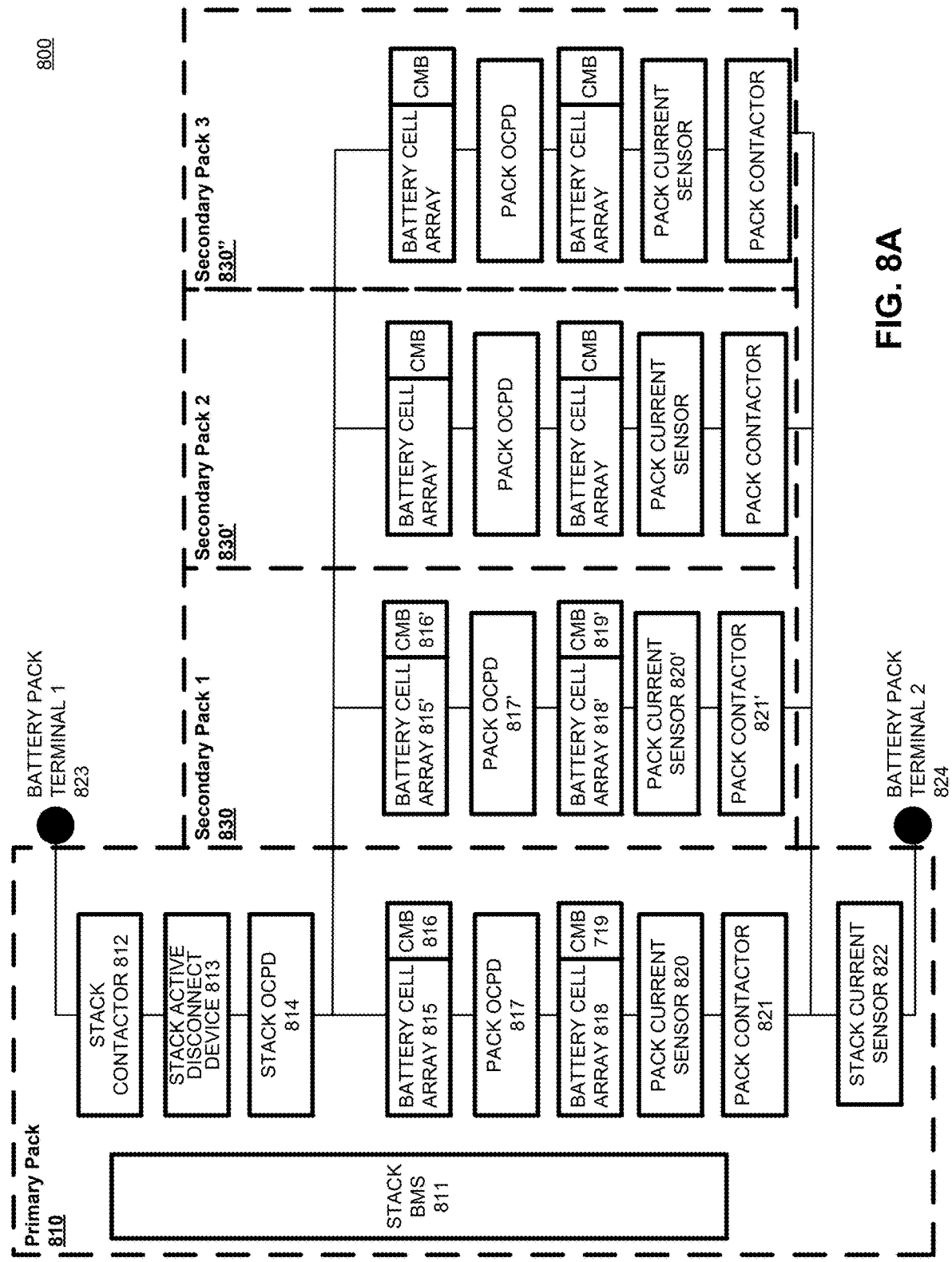
FIGS. 8A-8C show architectures for electric vehicle battery systems according to some embodiments.
Figure 8B:
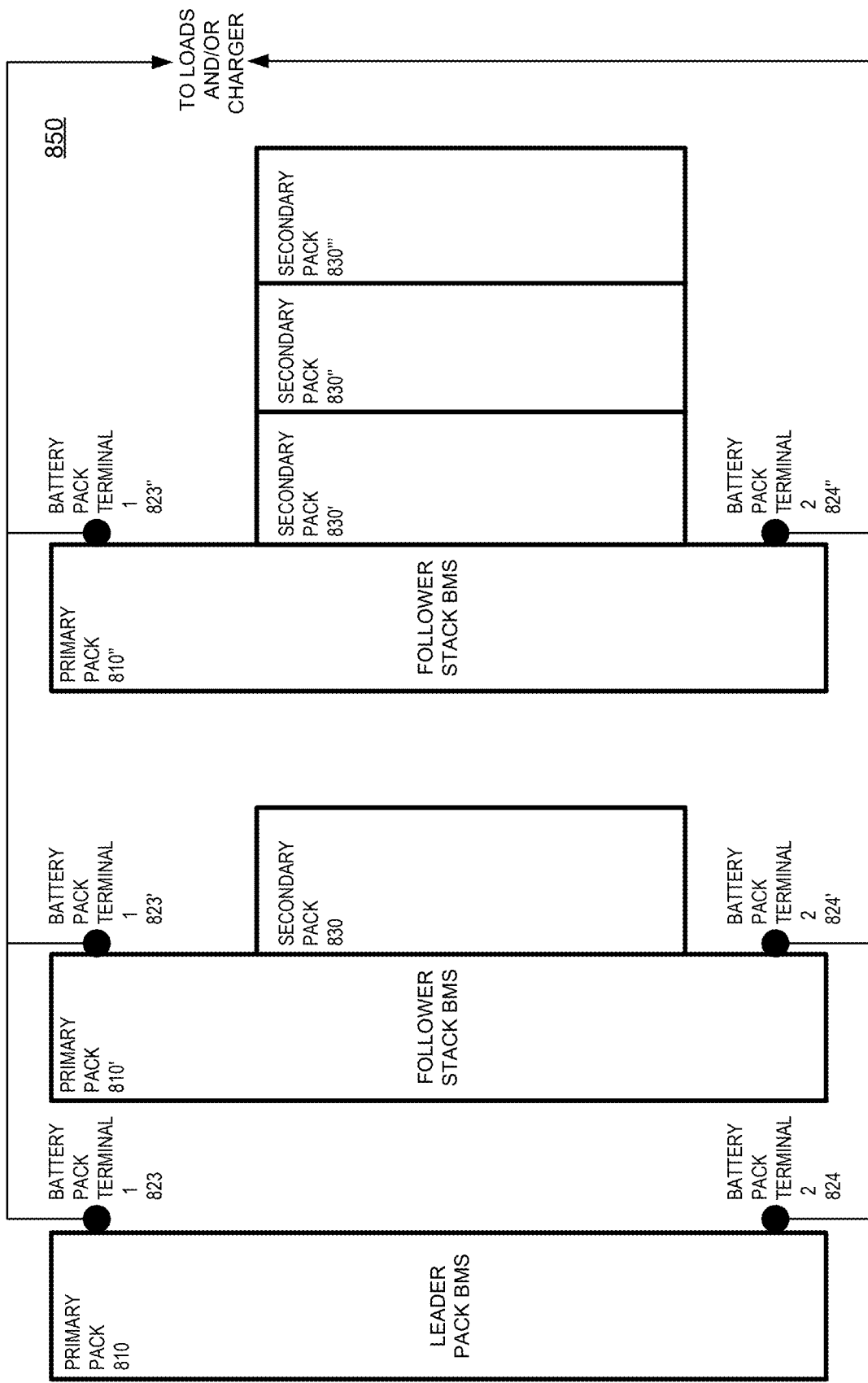
Figure 8C:
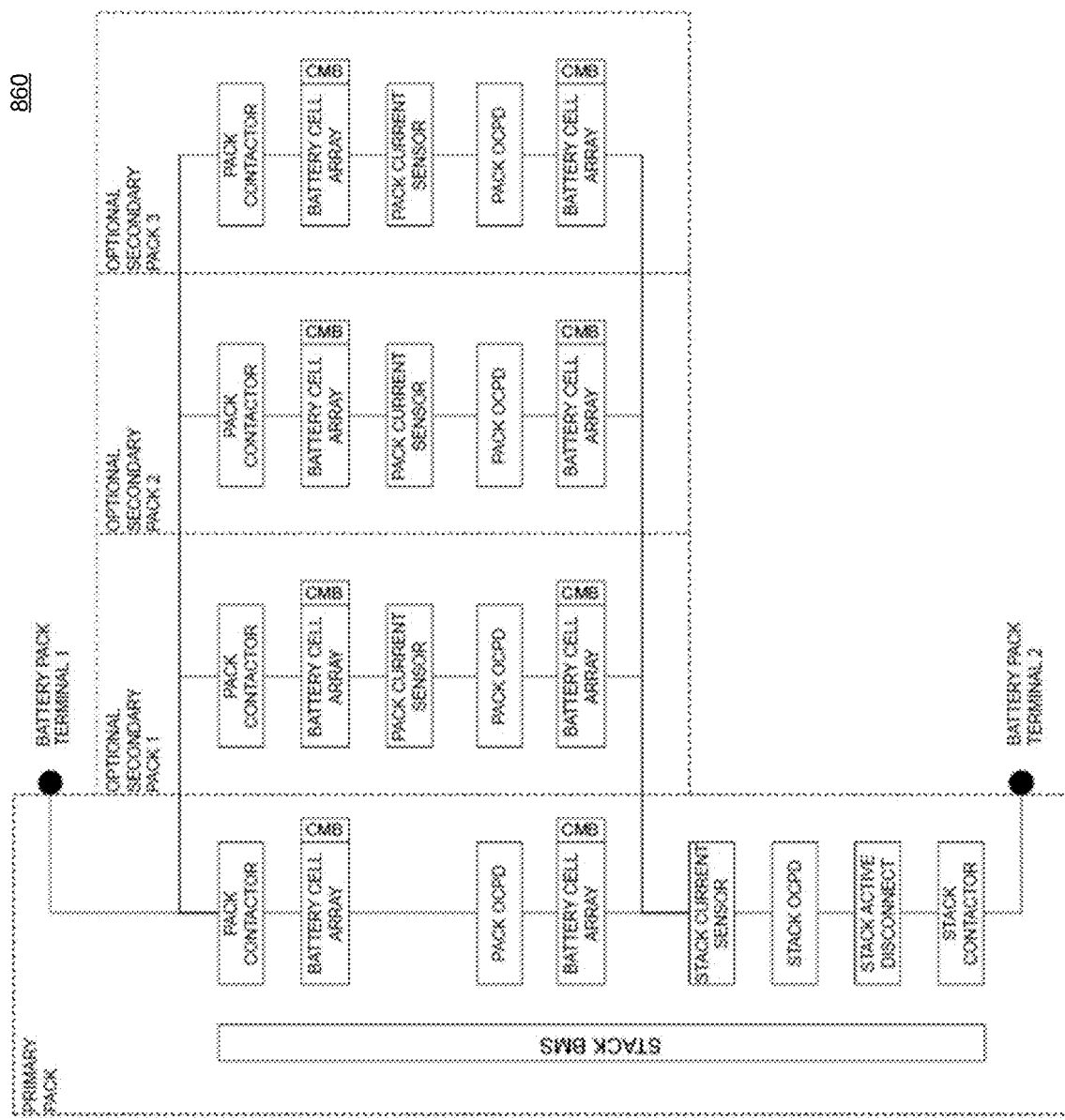

FIGS. 8A-8C illustrate potential architectures for battery pack systems. FIG. 8A illustrates a first architecture 800, FIG. 8B illustrates a second architecture 850, and FIG. 8C illustrates a third architecture 860. The first architecture 800 features a primary pack 810 (e.g., a leader pack) and one or more secondary packs (e.g., follower packs), illustrated as secondary pack 1 830, secondary pack 2 830', and secondary pack 3 830". The primary pack 810 has a stack BMS 811, a stack contactor 812, a stack active disconnect device 813, a stack overcurrent protection device (OCPD) 814, a first battery cell array 815 with a battery cell monitoring board (CMB) 816, a battery pack OCPD 817, a second battery cell array 818 with a second CMB 819, a battery pack current sensor 820, a battery pack contactor 821, and a stack current sensor 822. The stack contactor 812 is in electrical communication with battery pack terminal 1 823 and stack current sensor 822 is in electrical communication with battery pack terminal 2 824. Each of the secondary packs 830, 830', 830" has a first battery cell array 815' with a battery cell monitoring board (CMB) 816', a battery pack OCPD 817', a second battery cell array 818' with a second CMB 819', a battery pack current sensor 820', and a battery pack contactor 821'. The battery pack stack is a mechanical assembly of two or more battery packs 200 with high voltage electrically connected in parallel with the enclosures. Each stack with N number of packs contains 1 primary pack and N−1 secondary pack types which results in a system with one BMS, one HV interface and one LV interface per battery pack stack 202 (FIG. 2D).

The second architecture in FIG. 8B shows a first primary pack 810 with one or more secondary packs 810', 810" in electrical communication via battery pack terminal 1 823 and battery pack terminal 2 824 on the primary pack 810 with battery pack terminal 1 823', 823" and battery pack terminal 2 824', 824" on the secondary primary packs 810', 810". The secondary primary pack 810' is shown with a secondary pack 830, and the third secondary primary pack 810" is shown with three secondary packs 830', 830", 830'". In this architecture, the primary pack 810 has a leader pack BMS and both of the secondary primary packs 810', 810" have follower stack BMS.

As will be appreciated from FIG. 8B, multiple stacks may be connected electrically in parallel within the overall vehicle or system. In the case of multiple stacks within a system, the stack level BMS's will coordinate internally in a leader/follower architecture, such that there is a single controls interface to the external system controller(s). Additionally, the battery packs and battery pack stacks of different secondary pack counts can work with each other in parallel, which provides significant integration flexibility for the system integrator. e.g., a battery pack, a 2 stack and a 4 stack can run in parallel, despite having n kWH, 2n KWH and other having 4n KWH energy.

The third architecture in FIG. 8C is similar to the second architecture, but with a different arrangement of the same components.

In some embodiments, a battery pack 200 as described herein can comprise a vent compartment 900 that allows air flow into and out of the battery pack 200. In such embodiments, the vent compartment 900 can comprise one or more through openings formed the enclosure 110. In some embodiments, the vent compartment 900 can be integrally formed (for example, integrally cast) with the enclosure 110.

Figure 9:
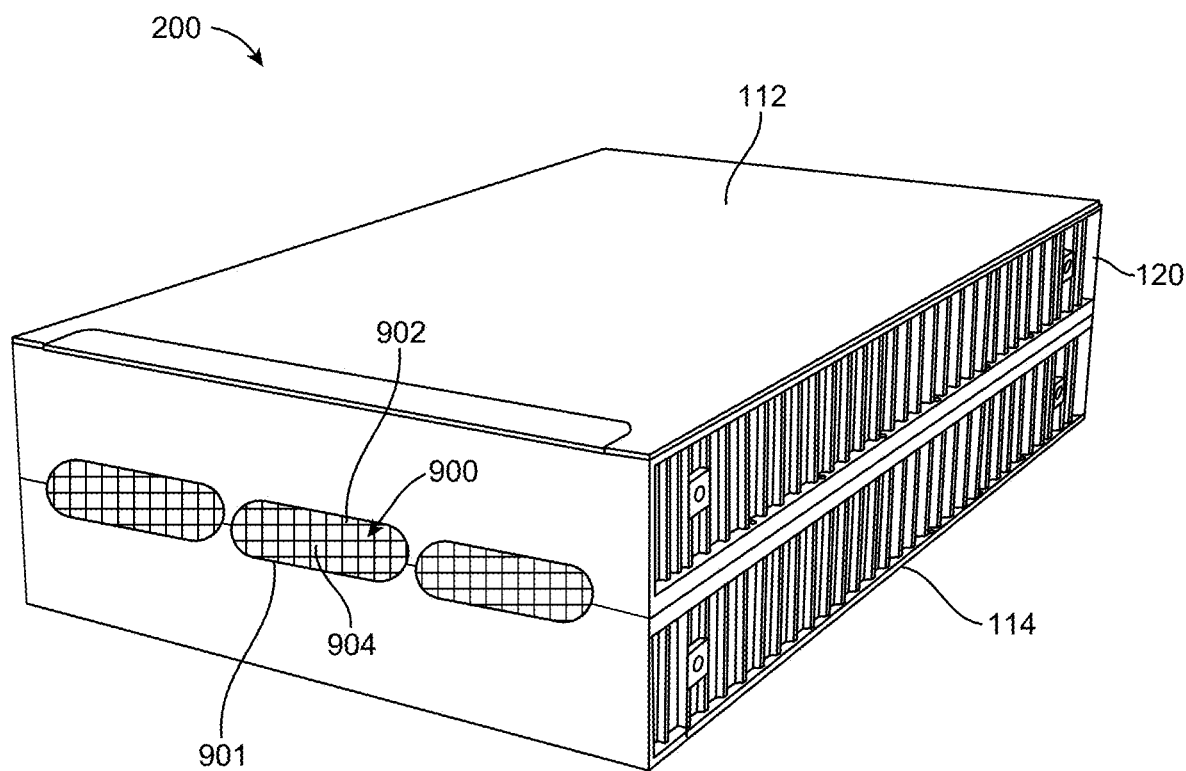
FIG. 9 shows an electric vehicle battery pack comprising a vent compartment according to some embodiments.

FIG. 9 shows an electric vehicle battery pack 200 comprising a vent compartment 900 according to some embodiments. In some embodiments, the first sub-pack 114 can comprise a first venting bay 901 and the second sub-pack 120 can comprise a second venting bay 902, such that when the first sub-pack 114 and the second sub-pack 120 are assembled, the first and second venting bays 901, 902 define the vent compartment 900. In some embodiments, the first venting bay 901 can be formed in frame 115 of the first sub-pack 114 and the second venting bay 902 can be formed in frame 122 of the second sub-pack 120.

In some embodiments, battery pack 200 can comprise a plurality of vent compartments 900. In such embodiments, corresponding venting bays 901, 902 formed in the first sub-pack 114 and the second sub-pack 120 can define the plurality of vent compartments 900. In some embodiments, a vent valve 904 can be disposed in a vent compartment 900 to direct the flow of air into and out of the battery pack 200.

In some embodiments a battery pack 200 can be manufactured according to the following method. Unless stated otherwise, the steps of the method need not be performed in the order set forth herein. Additionally, unless specified otherwise, the steps of the method need not be performed sequentially. The steps can be performed in a different order or simultaneously. Further, the method may not comprise all the steps described.

Step 1: A metal alloy material forming each sub-pack of the enclosure is provided that is anti-corrosive and coated with a tailorable X1 thickness to generate: (1) a battery cell compartment and an ancillary compartment that provides a minimum viable first layer of dielectric insulation; (2) a coolant compartment that provides a required corrosion resistance towards coolant; and (3) an anti-corrosion coating that allows for friction stir welding with the substrate, even with dissimilar metals chosen for the cover plate.

In some embodiments, the metal alloy material can be a magnesium-based alloy (e.g., AZ91D, AM60, AM50, AM20, etc.). Additives can be added to the alloy to form a derivative alloy that reduces flammability of the alloy material, enhances ductility for casting and machining, and/or improves castability and corrosion resistance of the alloy. In some embodiments, the magnesium alloy can be an AZ63 magnesium alloy, an AZ81 magnesium alloy, an AZ91 magnesium alloy, an AM20 magnesium alloy, an AM50 magnesium alloy, an AM60 magnesium alloy, an AE42 magnesium alloy, an AS41 magnesium alloy, a ZK51 magnesium alloy, a ZK61 magnesium alloy, a ZE41 magnesium alloy, a ZC63 magnesium alloy, an HK31 magnesium alloy, an HZ32 magnesium alloy, a QE22 magnesium alloy, a QH21 magnesium alloy, a WE54 magnesium alloy, a WE43 magnesium alloy, an AZ31 magnesium alloy, an AZ61 magnesium alloy, an AZ80 magnesium alloy, a ZK60 magnesium alloy, an MIA magnesium alloy, an HK31 magnesium alloy, an HM21 magnesium alloy, a ZE41 magnesium alloy, a ZC71 magnesium alloy, a ZM21 magnesium alloy, an AM40 magnesium alloy, a K1A magnesium alloy, an M1 magnesium alloy, a ZK10 magnesium alloy, a ZK20 magnesium alloy, a ZK30 magnesium alloy, or a ZK40 magnesium alloy.

As will be appreciated by those skilled in the art, magnesium is a suitable material for the metal alloy substrate and provides the advantage of having a lower weight than aluminum, which results in significant reduction of weight of the overall structure. Additionally, magnesium can be produced using electrolytic processes (e.g., brine instead of mine). The use of magnesium supports a decarbonization of the material and reduces the overall carbon footprint of the enclosure.

Step 2: The battery cell compartment surface is coated with dielectric insulation material with X2 thickness. In some embodiments, the X2 thickness is selected based on the HV insulation specification for the manufactured battery pack.

Step 3: A structural adhesive with high thermal conductive properties is flooded on top of the dielectric coating to achieve a thickness of X3a for the adhesive height on cell and a thickness of X3b for the bond gap to cell. The X3b thickness for the bond gap to cell also serves as a secondary dielectric layer.

Step 4. A plurality of battery cells is installed within each half of the enclosure. The battery platform can be used with multiple chemistries, including nickel-based cathodes of lithium ion, iron-based cathodes of lithium or sodium-ion batteries like PBA, Polyanion and Layered Oxides, as discussed above. The battery platform can utilize 46 mm cylindrical cell diameter format and the overall battery pack design can use 46 × (with x ranging from about 60 mm to about 200 mm) of any chemistry, prismatic cells, blade cells, or pouch cells. Because of the flexibility of the manufacturing process, the same production line, can be used to produce all chemistries resulting in a highly capital efficient manufacturing process. Additionally the manufactured battery pack, stacks and systems can integrate multiple chemistries easier. FIG. 10 is a table of example specifications for a scalable, multi-chemistry pack.

Step 5: A thermo-structural encapsulant compound is dispensed on top of the structural adhesive to achieve a thickness of X4a for the encapsulant height on cell and a thickness of X4b for the cover gap to cell.

Step 6: On top of the encapsulant compound a thickness of X5 is reserved to allow a thermal runaway and arc protection barrier to be placed (e.g. a mica cover). In some embodiments, the symmetrical or mirror shaped design of the battery sub-pack allows one plate to be shared for the top of one battery pack and the bottom of another battery pack adjacent the first battery pack. In some embodiments, two sub-packs can each comprise a mica cover.

Step 7: A venting air gap of X6 is reserved on top of the barrier. The symmetrical or mirror design, allows each half of the battery pack to reserve ½ of the X6 thickness because the gap space is shared. Sharing the gap space allows for higher volumetric packaging density.

In some embodiments, a thixo-molding process of the metal alloy material unlocks the capability to produce wall-thickness that is 3 mm or less. The use of the coating and encapsulant strategies of the cell-to-pack (CTP) system enables the 3 mm or less thickness to achieve overall sufficient stiffness because the casting plus a structural cell array result in a highly stiff system.

Step 8: A first half of the enclosure is connected to a second half of the enclosure and the two sides are sealed.

Step 9: The coolant compartment is pressurized, e.g., to 30 psi. The pressurization is enabled because of the CTP process with a fully structural cell array result in sufficient stiffness to support the pressurization while reducing material, weight and cost. For example, the side walls of the battery pack may be too compliant with a <3 mm wall, however, combined load sharing bonded with a structural cell array it will be sufficiently stiff. This reduces material, weight and cost.

The systems and methods according to aspects of the disclosed subject matter may utilize a variety of computer and computing systems, communications devices, networks and/or digital/logic devices for operation. Each may, in turn, be configurable to utilize a suitable computing device that can be manufactured with, loaded with and/or fetch from some storage device, and then execute, instructions that cause the computing device to perform a method according to aspects of the disclosed subject matter. Moreover, the systems and methods can be in communication with a main system.

A computing device can include without limitation a mobile user device and a processor to perform logic and other computing operations, e.g., a stand-alone computer processing unit ("CPU"), or hard wired logic as in a microcontroller, or a combination of both, and may execute instructions according to its operating system and the instructions to perform the steps of the method, or elements of the process. The computing device may be part of a network of computing devices and the methods of the disclosed subject matter may be performed by different computing devices associated with the network, perhaps in different physical locations, cooperating or otherwise interacting to perform a disclosed method. For example, a portable computing device may run an app alone or in conjunction with a remote computing device, such as a server on the Internet. For purposes of the present application, the term "computing device" includes any and all of logic circuitry, communications devices and digital processing capabilities or combinations of these.

Certain embodiments of the disclosed subject matter may be described for illustrative purposes as steps of a method that may be executed on a computing device executing software, and illustrated, by way of example only, as a block diagram of a process flow. Such may also be considered as a software flow chart. Such block diagrams and like operational illustrations of a method performed or the operation of a computing device and any combination of blocks in a block diagram, can illustrate, as examples, software program code/instructions that can be provided to the computing device or at least abbreviated statements of the functionalities and operations performed by the computing device in executing the instructions. Some possible alternate implementation may involve the function, functionalities and operations noted in the blocks of a block diagram occurring out of the order noted in the block diagram, including occurring simultaneously or nearly so, or in another order or not occurring at all. Aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

The instructions may be stored on a suitable "machine readable medium" within a computing device or in communication with or otherwise accessible to the computing device. As used in the present application a machine readable medium is a tangible storage device and the instructions are stored in a non-transitory way. At the same time, during operation, the instructions may at times be transitory, e.g., in transit from a remote storage device to a computing device over a communication link. However, when the machine readable medium is tangible and non-transitory, the instructions will be stored, for at least some period of time, in a memory storage device, such as a random access memory (RAM), read only memory (ROM), a magnetic or optical disc storage device, or the like, arrays and/or combinations of which may form a local cache memory, e.g., residing on a processor integrated circuit, a local main memory, e.g., housed within an enclosure for a processor of a computing device, a local electronic or disc hard drive, a remote storage location connected to a local server or a remote server access over a network, or the like. When so stored, the software will constitute a "machine readable medium," that is both tangible and stores the instructions in a non-transitory form. At a minimum, therefore, the machine readable medium storing instructions for execution on an associated computing device will be "tangible" and "non-transitory" at the time of execution of instructions by a processor of a computing device and when the instructions are being stored for subsequent access by a computing device.

The software is operable to receive information from a safety sensor when the safety sensor detects, for example, crash, loss of system isolation, thermal runaway, liquid ingress, pressurized air ingress or loss of pressure and electrolyte leak. Status quo packs are operable to detect and communication safety issues through temperature, voltage, humidity and pressure sensors. The safety sensor utilizes one or more of the following sensed information: ambient temperature sensor, volatile organic compounds sensor, absolute pressure sensor, relative humidity sensor, accelerometer, and system HV isolation. The sensing abilities allow the battery pack to detect hazards. The detected information is provided to the BMS which then can take mitigation actions to control operation of the battery system by, for example, causing the telematics device of the safety state. Additionally, the telematics device can communicate with, for example, the safety state to a first responder. In some configurations, the safety sensor can be equipped with a trigger mechanism operable to directly activate a safety device as a backup. A wireless communication protocol can send safety state information to a third party.

The described electric vehicle battery packs can be advantageously employed in the transportation industry, including, but not limited to, automotive manufacturing, truck manufacturing, manufacturing of ships and boats, manufacturing of trains, airplanes, and spacecraft manufacturing. The term "automotive" and the related terms as used herein are not limited to automobiles and include various vehicle classes, such as, automobiles, cars, buses, motorcycles, marine vehicles, off highway vehicles, light trucks, trucks, or lorries. However, the battery packs are not limited to automotive parts; other types of battery packs manufactured according to the processes described in this application are envisioned. For example, the described packs can be advantageously employed in manufacturing of various parts of mechanical and other devices or machinery, including tools, mobile phones, tablet computers, bodies of electronic devices, and other parts and devices.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the metals, alloys, production methods, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "some embodiments," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of this disclosure should not be limited by any of the above-described exemplary embodiments, but should be defined only in accordance with the following claims and their equivalents.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed:

1. An electric vehicle battery pack, comprising:
   a first sub-pack comprising a first metal alloy enclosure comprising:
      a first single cast metal alloy frame comprising an open end,
      a first battery bay defined by the first single cast metal alloy frame, and
      a first set of battery cells disposed within the first battery bay; and
   a second sub-pack comprising a second metal alloy enclosure comprising:
      a second single cast metal alloy frame comprising an open end,
      a second battery bay defined by the second single cast metal alloy frame, and
      a second set of battery cells disposed within the second battery bay,
      wherein the first sub-pack is coupled to the second sub-pack such that: the open end of the first single cast metal alloy frame faces the open end of the second single cast metal alloy frame, the first single cast metal alloy frame is inverted relative to the second single cast metal alloy frame, and the first battery bay and the second battery bay together define a battery cell compartment comprising the first set of battery cells and the second set of battery cells,
      wherein the first set of battery cells are inverted relative to the second set of battery cells within the battery cell compartment,
      wherein the first single cast metal alloy frame comprises a first coolant compartment formed in an exterior surface of the first single cast metal alloy frame opposite the open end of the first single cast metal alloy frame,
      wherein the second single cast metal alloy frame comprises a second coolant compartment formed in an exterior surface of the second single cast metal alloy frame opposite the open end of the second single cast metal alloy frame, and
      wherein the first coolant compartment is inverted relative to the second coolant compartment.

2. The electric vehicle battery pack of claim 1, wherein an interior sidewall of the first sub-pack and an interior sidewall of the second sub-pack are coated with a sealant bonding the first sub-pack to the second sub-pack.

3. The electric vehicle battery pack of claim 2, wherein the first sub-pack and the second sub-pack are coupled with a plurality of mechanical fasteners.

4. The electric vehicle battery pack of claim 3, wherein an exterior sidewall of the first sub-pack and an exterior sidewall of the second sub-pack are coated with a second sealant bonding the first sub-pack to the second sub-pack.

5. The electric vehicle battery pack of claim 1, wherein the first battery bay comprises a plurality of first spots in which a respective one of the battery cells in the first set of battery cells is disposed, the first spots being demarcated by a plurality of protrusions extending from an interior surface of the first battery bay, and
   wherein the second battery bay comprises a plurality of second spots in which a respective one of the battery cells in the second set of battery cells is disposed, the second spots being demarcated by a plurality of protrusions extending from an interior surface of the second battery bay.

6. The electric vehicle battery pack of claim 5, wherein each of the first spots comprises at least a portion of a first gully network formed in the interior surface of the first battery bay.

7. The electric vehicle battery pack of claim 6, wherein the first gully network comprises an electrical contact electrically coupled to the first set of battery cells.

8. The electric vehicle battery pack of claim 6, wherein each of the second spots comprises at least a portion of a second gully network formed in the interior surface of the second battery bay.

9. The electric vehicle battery pack of claim 8, wherein the second gully network comprises an electrical contact electrically coupled to the second set of battery cells.

10. The electric vehicle battery pack of claim 5, wherein the plurality of protrusions extending from the interior surface of the first battery bay comprises a plurality of discrete spires extending from the interior surface.

11. The electric vehicle battery pack of claim 1, wherein the first sub-pack comprises a first venting bay and the second sub-pack comprises a second venting bay, and wherein the first sub-pack is coupled to the second sub-pack such that the first venting bay and the second venting bay define a vent compartment.

12. The electric vehicle battery pack of claim 11, further comprising a vent valve disposed in the vent compartment.

13. The electric vehicle battery pack of claim 1, wherein the first coolant compartment comprises walls configured to direct a flow of a coolant through the first coolant compartment.

14. The electric vehicle battery pack of claim 13, comprising a first plate attached to the walls of the first coolant compartment and to a perimeter wall of the first coolant compartment, wherein the first plate seals the first coolant compartment to create a closed volume for the flow of the coolant in the first coolant compartment.

15. The electric vehicle battery pack of claim 14, wherein the first plate is welded to or adhesively bonded to the walls of the first coolant compartment.

16. The electric vehicle battery pack of claim 1, comprising a coolant interconnect configured to allow coolant to flow within the first coolant compartment and the second coolant compartment.

17. The electric vehicle battery pack of claim 16, wherein the coolant interconnect comprises a coolant inlet coupled to the first coolant compartment and the second coolant compartment, and a coolant outlet coupled to the first coolant compartment and the second coolant compartment.

18. The electric vehicle battery pack of claim 1, wherein the first coolant compartment is located on a bottom side of the electric vehicle battery pack and the second coolant compartment is located on a top side of the electric vehicle battery pack opposite the first coolant compartment.

19. The electric vehicle battery pack of claim 18, wherein the first battery bay comprises an interior surface juxtaposed to an interior surface of the first coolant compartment, the interior surface of the first battery bay comprising an electrical contact electrically coupled to the first set of battery cells, and wherein the second battery bay comprises an interior surface juxtaposed to an interior surface of the second coolant compartment, the interior surface of the second battery bay comprising an electrical contact electrically coupled to the second set of battery cells.

20. The electric vehicle battery pack of claim 19, wherein the interior surface of the first coolant compartment comprises micro surface features formed on the interior surface.

21. The electric vehicle battery pack of claim 19, wherein the interior surface of the first coolant compartment comprises a plurality of hollow protrusions cast with the first single cast metal alloy frame, extending from the interior surface of the first coolant compartment, and in fluid communication with a volume of first coolant compartment where coolant is configured to flow, wherein each of the plurality of hollow protrusions extends into the first battery bay, and wherein the first battery bay comprises a plurality of first spots in which a respective one of the battery cells in the first set of battery cells is disposed, the first spots being demarcated by protrusions comprising the plurality of hollow protrusions.

22. The electric vehicle battery pack of claim 1, wherein the first sub-pack comprises a first ancillary bay located adjacent to the first battery bay, wherein the second sub-pack comprises a second ancillary bay located adjacent to the second battery bay, and wherein the first ancillary bay and the second ancillary bay define an ancillary compartment in the electric vehicle battery pack.

23. The electric vehicle battery pack of claim 22, wherein the ancillary compartment comprises a battery management system controller component, an automatic disconnect device, and an active safety device, and wherein the active safety device comprises one or more of a controller, a fuse, a pyrofuse, a contactor, a relay, a busbar, a connector, a current sensor, a voltage sensor, a high-voltage connector, a low voltage connector, or a low voltage harness.

24. The electric vehicle battery pack of claim 22, wherein the first sub-pack or the second sub-pack comprises a through opening formed in a wall of the ancillary compartment.

25. The electric vehicle battery pack of claim 24, wherein the through opening is configured to receive an electrical interconnect to electrically connect the electric vehicle battery pack to another electric vehicle battery pack.

26. An electric vehicle battery assembly, comprising:
the electric vehicle battery pack of claim 1 as a first electric vehicle battery pack in the assembly;
a second electric vehicle battery pack of claim 1 comprising a third set of battery cells inverted relative to a fourth set of battery cells and a third coolant compartment formed in the first sub-pack or the second sub-pack of the second electric vehicle battery pack, and inverted relative to the first coolant compartment; and
a stackable architecture comprising:
a first coolant interconnect coupled to the first electric vehicle battery pack and a second coolant interconnect coupled to the second electric vehicle battery pack, the first and second coolant interconnects configured to allow coolant to flow within the first coolant compartment and the third coolant compartment; and
an electrical interconnect electrically connecting the first electric vehicle battery pack to the second electric vehicle battery pack, wherein the electrical interconnect is received within a first through opening in a bottom of the first electric vehicle battery pack and within an adjacent second through opening in a top of the second electric vehicle battery pack.

27. The electric vehicle battery assembly of claim 26, wherein the first electric vehicle battery pack comprises a first plate attached to the bottom of the first electric vehicle battery pack, wherein the first plate seals the first coolant compartment to create a closed volume for the flow of the coolant in the first coolant compartment,
wherein the second electric vehicle battery pack comprises a second plate attached to the top of the second electric vehicle battery pack, wherein the second plate seals the third coolant compartment to create a closed volume for the flow of the coolant in the third coolant compartment, and
the first plate is stacked on top of the second plate in the electric vehicle battery assembly.

28. The electric vehicle battery pack of claim 1, wherein the open end of the first single cast metal alloy frame is sealed to the open end of the second single cast metal alloy frame with a sealant.

29. The electric vehicle battery pack of claim 1, wherein the first set of battery cells are disposed entirely within the first battery bay and the second set of battery cells are disposed entirely within the second battery bay, and
wherein all the battery cells in the first battery bay are inverted relative to all the battery cells in the second battery bay.

* * * * *